(12) United States Patent
Matsumura et al.

(10) Patent No.: US 8,403,305 B2
(45) Date of Patent: Mar. 26, 2013

(54) GAS/LIQUID MIXING DEVICE

(76) Inventors: Eiji Matsumura, Kawasaki (JP); Nobuko Hagiwara, Chuo-ku (JP)

( * ) Notice: Subject to any disclaimer, the term of this patent is extended or adjusted under 35 U.S.C. 154(b) by 708 days.

(21) Appl. No.: 12/310,374

(22) PCT Filed: Aug. 21, 2007

(86) PCT No.: PCT/JP2007/066197
§ 371 (c)(1),
(2), (4) Date: Nov. 20, 2009

(87) PCT Pub. No.: WO2008/023704
PCT Pub. Date: Feb. 28, 2008

(65) Prior Publication Data
US 2010/0301498 A1 Dec. 2, 2010

(30) Foreign Application Priority Data
Aug. 21, 2006 (JP) .................................. 2006-224730

(51) Int. Cl.
*B01F 3/04* (2006.01)
(52) U.S. Cl. .................... 261/76; 261/118; 261/DIG. 42
(58) Field of Classification Search .................... 261/76, 261/118, DIG. 42; 210/220
See application file for complete search history.

(56) References Cited

U.S. PATENT DOCUMENTS

| 6,178,953 B1 * | 1/2001 | Cox ............... 123/536 |
| 6,673,248 B2 * | 1/2004 | Chowdhury ............ 210/739 |
| 6,896,851 B1 | 5/2005 | Onizuka et al. |

FOREIGN PATENT DOCUMENTS

| JP | 6-277476 | 10/1994 |
| JP | 8-131800 | 5/1996 |
| JP | 11-090453 | 4/1999 |
| JP | 3071399 | 6/2000 |
| JP | 2000-202458 | 7/2000 |
| JP | 2001-219194 | 8/2001 |
| JP | 2001-300278 | 10/2001 |
| JP | 2002-306086 | 10/2002 |
| JP | 2003-19486 | 1/2003 |
| JP | 2003-175324 | 6/2003 |
| JP | 2003-200174 | 7/2003 |
| JP | 2004-225691 | 8/2004 |
| JP | 2006-198499 | 8/2006 |
| JP | 3850027 | 11/2006 |

(Continued)

OTHER PUBLICATIONS

Feb. 1, 2005 "Environmental Improvement and Food Safety by Micro-bubble Technology." Takahashi, Masayoshi. Bulletin of the Society of Sea Water Science. vol. 59, No. 1, pp. 17-22.

*Primary Examiner* — Robert A Hopkins
(74) *Attorney, Agent, or Firm* — Jōrdan and Hamburg LLP

(57) ABSTRACT

The present invention provides an ozonated water generator which can generate highly soluble and highly concentrated ozonated water in an efficient and simple manner. In an ozonated water generator comprising a supply tube for transmitting a treated liquid, a gas/liquid mixing device provided in the path of the supply tube, and an ozone supply structure for supplying ozone to the gas/liquid mixing device. The gas/liquid mixing device is provided with a magnet for creating magnetic force in the interior. Creating magnetic force in both the treated liquid and the ozone makes it possible to generate highly soluble and highly concentrated ozonated water in an efficient and simple manner.

6 Claims, 20 Drawing Sheets

| | FOREIGN PATENT DOCUMENTS | |
|---|---|---|
| JP | 2007-167830 | 7/2007 |
| JP | 2008-153605 | 7/2008 |
| JP | 2009-160508 | 7/2009 |
| WO | WO-00/09243 | 2/2000 |

* cited by examiner

GAS/LIQUID MIXING DEVICE

BACKGROUND OF THE INVENTION

1. Field of the Invention

The present invention relates to a gas/liquid mixing device for mixing a gas into a liquid.

2. Description of Related Art

Examples of known gas/liquid mixing devices include the device disclosed in Patent Document 1 (herein below referred to as "first conventional device") and the device disclosed in Patent Document 2 (herein below referred to as "second conventional device"). The first conventional device is provided with a Venturi tube and a device for generating magnetic force lines orthogonal to the flow of fluid passing through the Venturi tube, and is configured to mix another fluid with the fluid passing through the Venturi tube. It is made clear throughout Patent Document 1 that both fluids are electrically conductive, i.e., both fluids are liquids. Specifically, the first conventional device is designed to generate electromotive force in the fluids by Faraday's law of induction, by passing magnetic force lines through both the fluid (liquid) flowing through the Venturi tube and the other fluid (liquid), thereby activating the fluids and increasing their reaction rate with the reactant.

Patent Document 1: Japanese Laid-open Patent Application No. 2001-300278 (Paragraphs 0001 and 0015, FIGS. 1 and 2)

Patent Document 2: Japanese Laid-open Patent Application No. 2003-175324 (Paragraph 0005, FIG. 2)

Patent Document 2 discloses a gas/liquid mixing device that uses magnetic force (herein below referred to as the "second conventional device"). The second conventional device has a plurality of fins configured in conical shapes of magnetic members in a water supply tube, an orifice formed at the downstream end of the fins, and a gas supply tube whose opening is positioned downstream of the orifice. The configuration is designed so that the magnetic force of electromagnets acts on the fins from outside of the water supply tube, and the magnetic force causes the fins to move in the radial direction, allowing the diameter of the orifice to be adjusted.

However, in the first conventional device and the second conventional device described above, gases and liquids cannot be mixed together efficiently. Since the first conventional device uses magnetic force lines in order to create electromotive force in the fluid (liquid) by means of the law of electromagnetic induction to begin with, there is no leeway in the application of the device as a gas/liquid mixing device for gas/liquid mixing; i.e., for mixing together gases and liquids. This is because gases are not electrically conductive, unlike liquids. According to the second conventional device, since the liquid passes through the interior which is magnetically sealed by the magnetic fins, this is equivalent to a situation in which the magnetic force of the electromagnets does not propagate through the liquid passing through the passage enclosed by the fins. Furthermore, since the opening of the gas supply tube of the second conventional device is placed downstream of the orifice as described above, the opening is not in a position where the magnetic force of the electromagnets can proactively reach the gas passing through the opening and the gas sprayed out from the opening. Therefore, the electromagnets do not contribute in any way in improving the efficiency of gas/liquid mixing. These points are speculated to be the reasons that the gas and liquid cannot be mixed efficiently. One problem to be solved by the present invention is to provide a gas/liquid mixing device capable of efficiently mixing gases and liquids.

SUMMARY OF THE INVENTION

The inventors of the present invention described above have discovered that gases and liquids can be mixed together in an extremely efficient and effective manner by causing magnetic force to be exerted on the liquid passing through to begin with and on the gas bubbles as well. The present invention was designed based on this type of discovery. The detailed configuration of the invention is described anew in the following paragraphs. The terminological definitions and the like used to describe an invention stated in any claim are intended to apply to the inventions stated in the other claims within a range that can be implemented based on the nature of the definitions.

The gas/liquid mixing device according to a first aspect (herein below referred to as the "device of the first aspect") comprises a Venturi tube having a small diameter section midway in a large diameter section, a gas supply pipe for supplying gas to a liquid passing through the small diameter section, and a magnet for generating magnetic force lines capable of extending through at least the liquid passing through the small diameter section and concurrently through gas bubbles of the gas contained in the liquid.

According to the device of the first aspect, liquid and gas supplied from the exterior can be mixed together efficiently. Going into greater detail, the action takes place as follows. Specifically, a pressure difference (negative pressure) is created by the Bernoulli process in the liquid (e.g., tap water, well water, filtered river or ocean water, pure water, ultrapure water, or a liquid or mixed liquid other than water) entering the small diameter section from the large diameter section, and this pressure difference draws the gas (e.g., ozone, oxygen, nitrogen, hydrogen, atmospheric air, or another mixed gas) supplied from the gas supply pipe into the liquid. The gas that has been drawn in is contained in the liquid in the form of gas bubbles. At this time, the liquid and gas bubbles are stirred up by the turbulent flow in the small diameter section. Magnetic force lines are made to extend through the stirred gas and gas bubbles in particular, whereby the gas and liquid are mixed together more efficiently than in cases of no through-extension by magnetic force lines. The causal association between through-extension of magnetic force lines and improvement in mixing efficiency, is currently being researched, it is safe to assume that the liquid and gas bubbles (the gas therein) are activated by the application of energy in the form of magnetic force. It is believed that the liquid and gas in the vicinities of the small diameter section are also activated.

The gas/liquid mixing device according to a second aspect (herein below referred to as the "device of the second aspect") comprises a magnetic permeable cylinder whose length direction is the direction in which liquid passes, a plurality of large diameter channels extending through the cylinder in the length direction, a small diameter channel formed midway in each of the large diameter channels, a gas supply channel for supplying gas to the liquid passing through the small diameter channel, and a magnet for generating magnetic force lines capable of extending through the liquid passing through at least each of the small diameter channels and concurrently through gas bubbles of the gas contained in the liquid. The device further comprises a liquid supply structure capable of diverging and supplying liquid to each of the large diameter channels, a liquid-receiving structure capable of collecting and receiving the liquid exhausted from each of the large diameter channels, and a gas supply structure capable of diverging and supplying gas to a gas supply channel in each of the large diameter channels. The large diameter channels and small diameter channels are preferably formed so as to have substantially the same shape (same dimensions). It is also preferable that the embodiments (shapes, supply states) of the liquid supply structure and (liquid-receiving structure) and gas supply structure associated with the large diameter channels (small diameter channels) be formed so as to be substantially uniform. This is because the gas and liquid can be mixed together in the large diameter channels (small diameter channels) in a balanced manner, and as a result, it is possible to prevent a specified large diameter channel (small diameter channel) from being subjected to an excessive load.

According to the device of the second aspect, a plurality of the same functions as the device of the first aspect can be achieved simultaneously. Specifically, the liquid supplied from the exterior via the liquid supply structure and the gas supplied from the exterior via the gas supply structure can be efficiently mixed together, and mixing efficiency can be improved quantitatively as well. Going into greater detail, the action takes place as follows. Specifically, a pressure difference (negative pressure) is created through the Bernoulli process in the liquid (e.g., tap water, well water, filtered river or ocean water, pure water, ultrapure water, or a liquid or mixed liquid other than water) entering the small diameter channel from the large diameter channel, and this pressure difference draws the gas (e.g., ozone, oxygen, nitrogen, hydrogen, atmospheric air, or another mixed gas) supplied from the gas supply channel into the liquid. The gas that has been drawn in is contained in the liquid in the form of gas bubbles. At this time, the liquid and the liquid and gas bubbles are stirred up by the turbulent flow in the small diameter channel. Magnetic force lines are made to extend through the stirred gas and gas bubbles, whereby the gas and liquid are mixed together more efficiently than in cases in which no magnetic force lines are extending through. Since the gas/liquid mixing action described above takes place simultaneously in a plurality of large diameter channels (small diameter channels), mixing efficiency can be improved from a quantitative standpoint. The gas/liquid-mixed liquid that has passed through the large diameter channels (small diameter channels) is collected by the liquid-receiving structure and can be extracted all at once. The gas/liquid mixing device according to a third aspect (herein below referred to as the "device of the third aspect") comprises the essential configuration of the device of the first aspect, wherein the gas supply pipe and the magnet are configured so that the magnetic force lines are capable of traversing the gas passing through the gas supply pipe. In other words, the gas supply pipe is configured from a magnetic permeable member, and the magnet is configured so as to generate magnetic force lines capable of traversing the gas entering the magnetic permeable pipe and passing through the interior.

According to the device of the third aspect, mixing efficiency can be improved in addition to the operational effects of the device of the first aspect. Presumably, this is because the gas is activated both before and after mixing by applying magnetic energy to the gas passing through the interior of the gas supply pipe.

The gas/liquid mixing device according to a fourth aspect (herein below referred to appropriately as the "device of the fourth aspect") comprises the essential configuration of the device of any of the first through third aspects, wherein the magnet is configured from a magnetic circuit containing one magnet piece and another magnet piece, and the one magnet piece and the another magnet piece are placed so that the magnetic force lines generated from the one magnet are capable of traversing the small diameter section to reach the another magnet piece. It is common within the positional relationship of the one magnet piece and the other magnet piece for the two pieces to face each other across at least the small diameter section, but the positional relationship is not limited to this option alone.

According to the device of the fourth aspect, it is possible, by configuring the magnetic circuit, to cause the magnetic force lines (magnetic flux lines) generated by the one magnet piece and the another magnet piece to be focused on at least the small diameter section of the Venturi tube, and to generate a strong magnetic field at this same location. As a result, stronger magnetic force (magnetic field) can be made to act at this location even in cases in which magnets of equal strength are used. If the acting magnetic force becomes stronger, the activation of the liquid and gas bubbles is promoted proportionately and the efficiency of gas/liquid mixing is further improved.

The gas/liquid mixing device according to a fifth aspect (herein below referred to as the "device of the fifth aspect") comprises the essential configuration of the device of any of the first through fourth aspects, wherein the magnetic force of the magnet is set at from 3000 to 20000 Gauss.

According to the device of the fifth aspect, the operational effects of the device of any of the first through fourth aspects can be achieved with a magnet having a magnetic force in the aforementioned set range. The reason the strength of the magnet is set in this range is because this strength is easy to achieve. Specifically, a neodymium magnet is an example of a magnet that can be used in the present invention, and when procured commercially, such magnets are easily procurable, readily affordable, and capable of the magnetic force range described above. If stronger magnets than magnets of the aforementioned magnetic force range can be acquired, the use of such magnets is not discouraged. The gas/liquid mixing device according to a sixth aspect (herein below referred to as the "device of the sixth aspect") comprises the essential configuration of the device of any of the third through fifth aspects, wherein the distance between the one magnet piece and the another magnet piece is set to be less than the diameter D of the large diameter section. According to the device of the sixth aspect, in addition to the operational effects of the device of any of the third through fifth aspects, the number of magnetic force lines can be increased (the magnetic force can be strengthened) proportionately by reducing the distance. In other words, even with the same magnets, the magnetic force increases inversely proportional to the square of the distance between the magnets; therefore, the magnetic force is multiplied by four even if the distance is halved. This concept is utilized in an attempt to exert as strong of a magnetic force as possible into the small diameter section.

The gas/liquid mixing device according to a seventh aspect (herein below referred to as the "device of the seventh aspect") comprises the essential configuration of the device of any of the third through sixth aspects, wherein at least one other magnetic circuit having substantially the same structure as the aforementioned magnetic circuit (in other words, a total of at least two) is placed along the circumferential direction of the small diameter section at a predetermined interval from the aforementioned magnetic circuit.

According to the device of the seventh aspect, in addition to the operational effects of the device of any of the third through sixth aspects, the amount of magnetic force lines extending through the liquid and gas bubbles can be increased in proportion to the other added magnetic circuit. In other words, a stronger magnetic force can be applied to the liquid and gas bubbles to promote gas/liquid mixing. The gas/liquid mixing device according to an eighth aspect (herein below referred to as the "device of the eighth aspect") comprises the essential configuration of the device of the first aspect, wherein the inside diameter of the small diameter section is set to 3 mm or less.

According to the device of the eighth aspect, the operational effects of the device of the first aspect are exhibited more prominently. Setting the inside diameter of the small diameter section to over 3 mm is not discouraged, but the efficiency of gas/liquid mixing can be significantly increased by setting the inside diameter to 3 mm or less. This is demonstrated in an experiment described hereinafter. The gas/liquid mixing device according to a ninth aspect (herein below referred to as the "device of the ninth aspect") comprises the essential configuration of the device of the second aspect, wherein all of the large diameter channels and small diameter channels are formed so as to have substantially the same shape, and the outside diameter of the small diameter channel is set to 3 mm or less.

According to the device of the ninth aspect, the operational effects of the device of the second aspect are exhibited more prominently. Setting the outside diameter of the small diameter channel to over 3 mm is not discouraged, but the efficiency of gas/liquid mixing can be significantly increased by setting the outside diameter to 3 mm or less. This is demonstrated in an experiment described hereinafter. According to the present invention, liquid supplied from the exterior and gas supplied from the exterior can be mixed together more efficiently.

DETAILED DESCRIPTION

Figure 1:
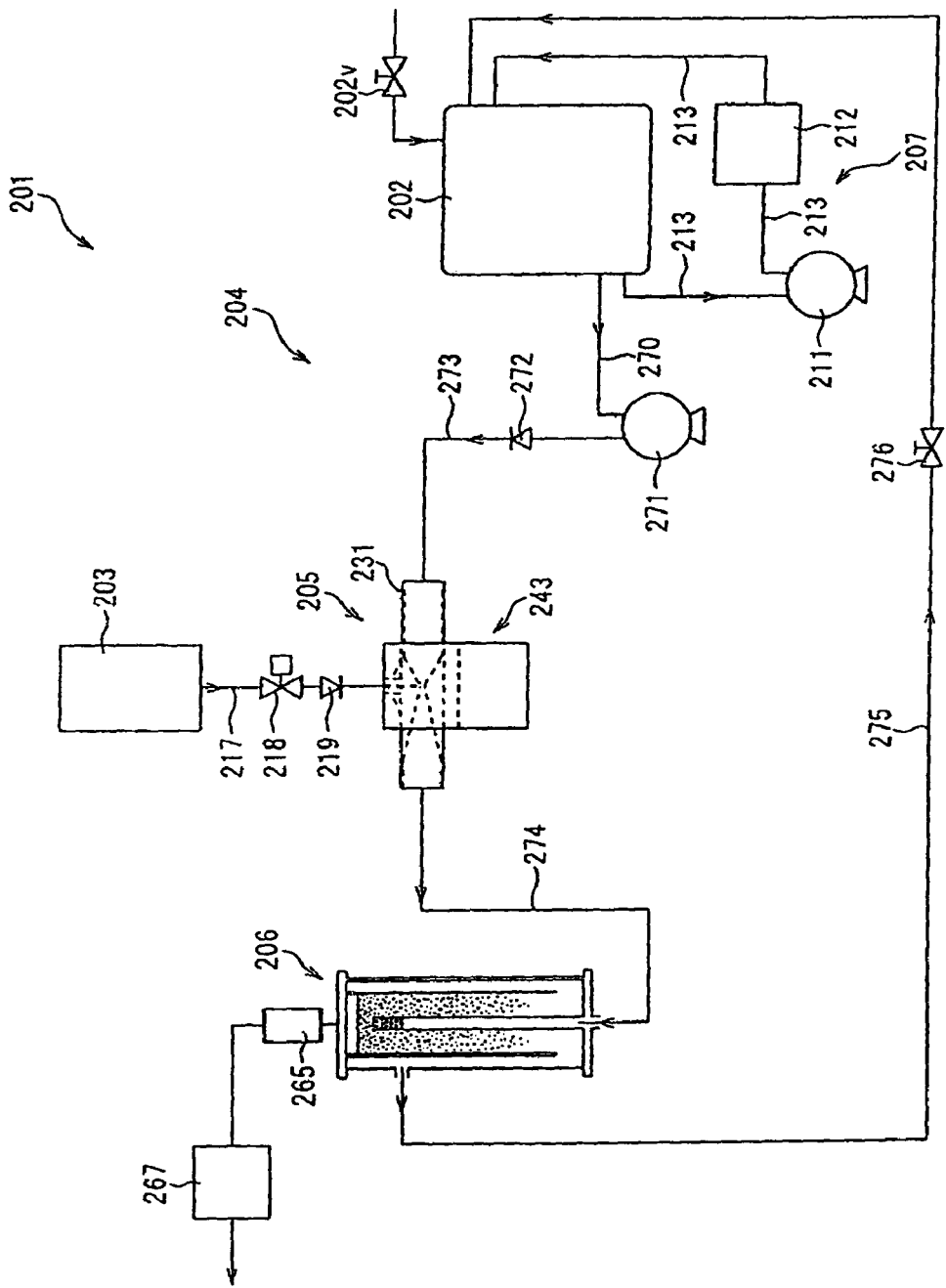
FIG. 1 is a schematic structural view of a gas-containing liquid generating device in which a gas/liquid mixing device can be installed.
Figure 2:
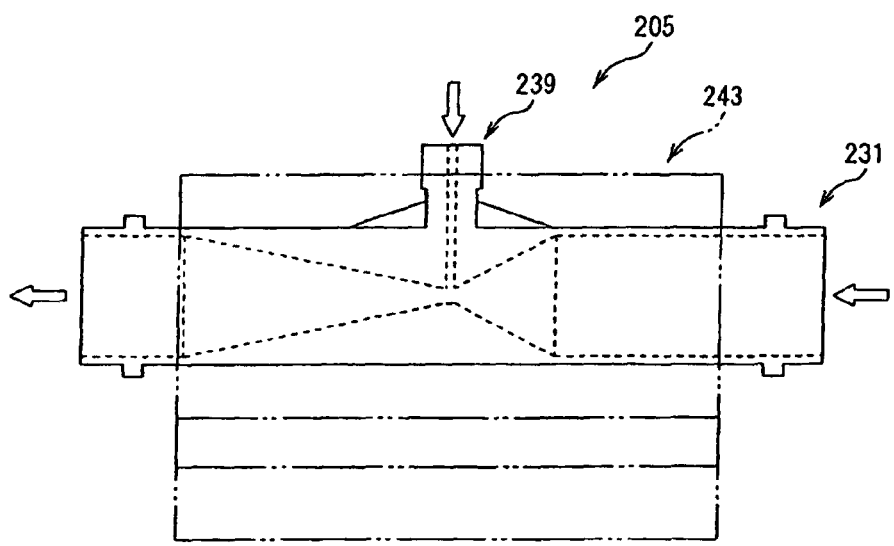
FIG. 2 is front view of a gas/liquid mixing device.
Figure 3:
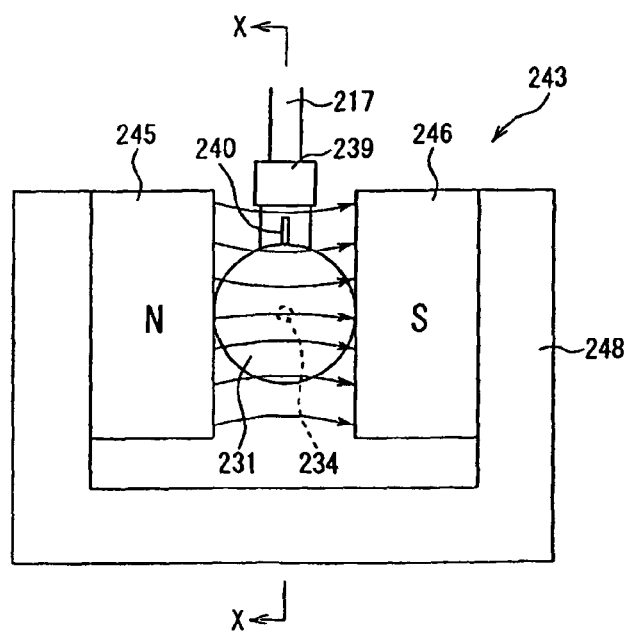
FIG. 3 is a left side view of the gas/liquid mixing device shown in FIG. 2.
Figure 4:
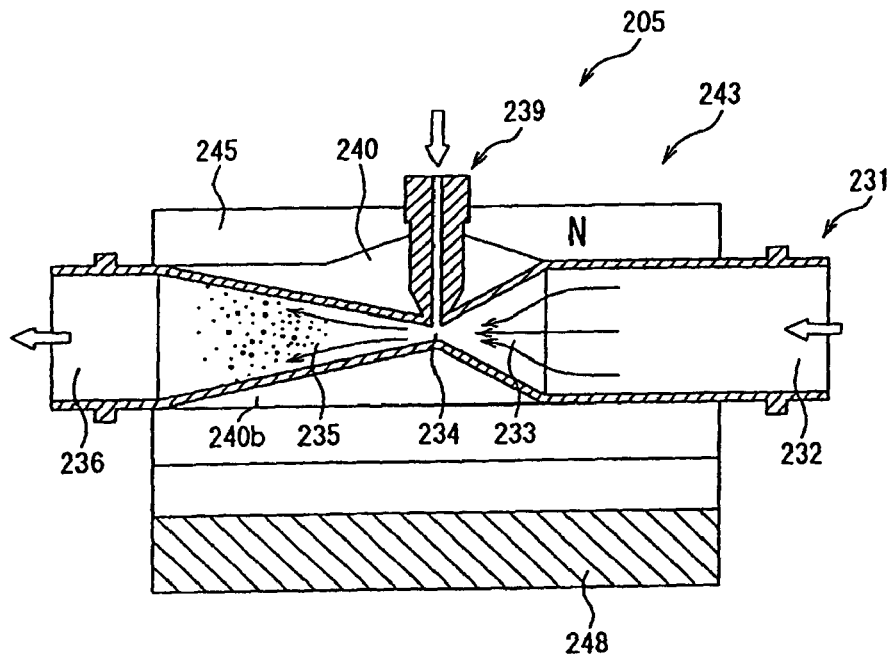
FIG. 4 is a sectional view along line X-X of the gas/liquid mixing device shown in FIG. 3.
Figure 5:
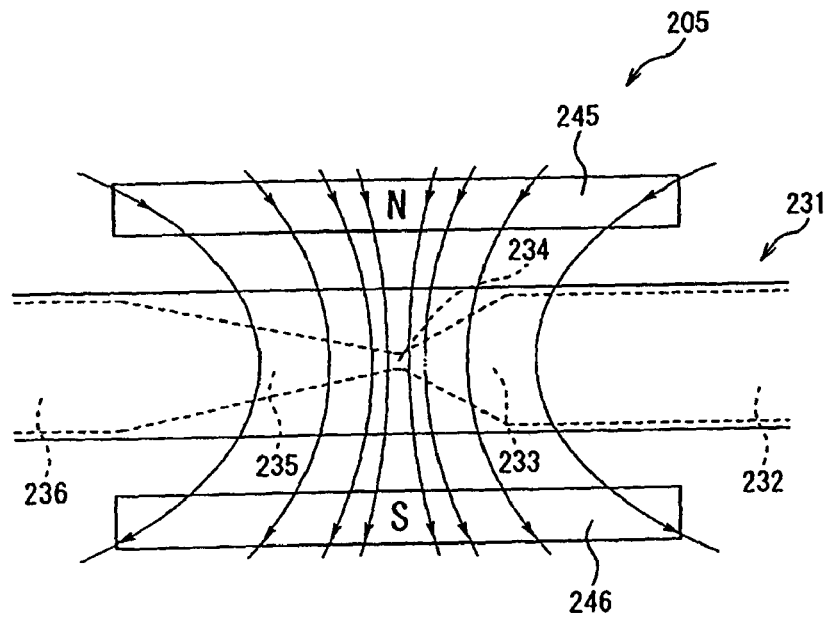
FIG. 5 is a plan view of the gas/liquid mixing device with a part omitted.
Figure 6:
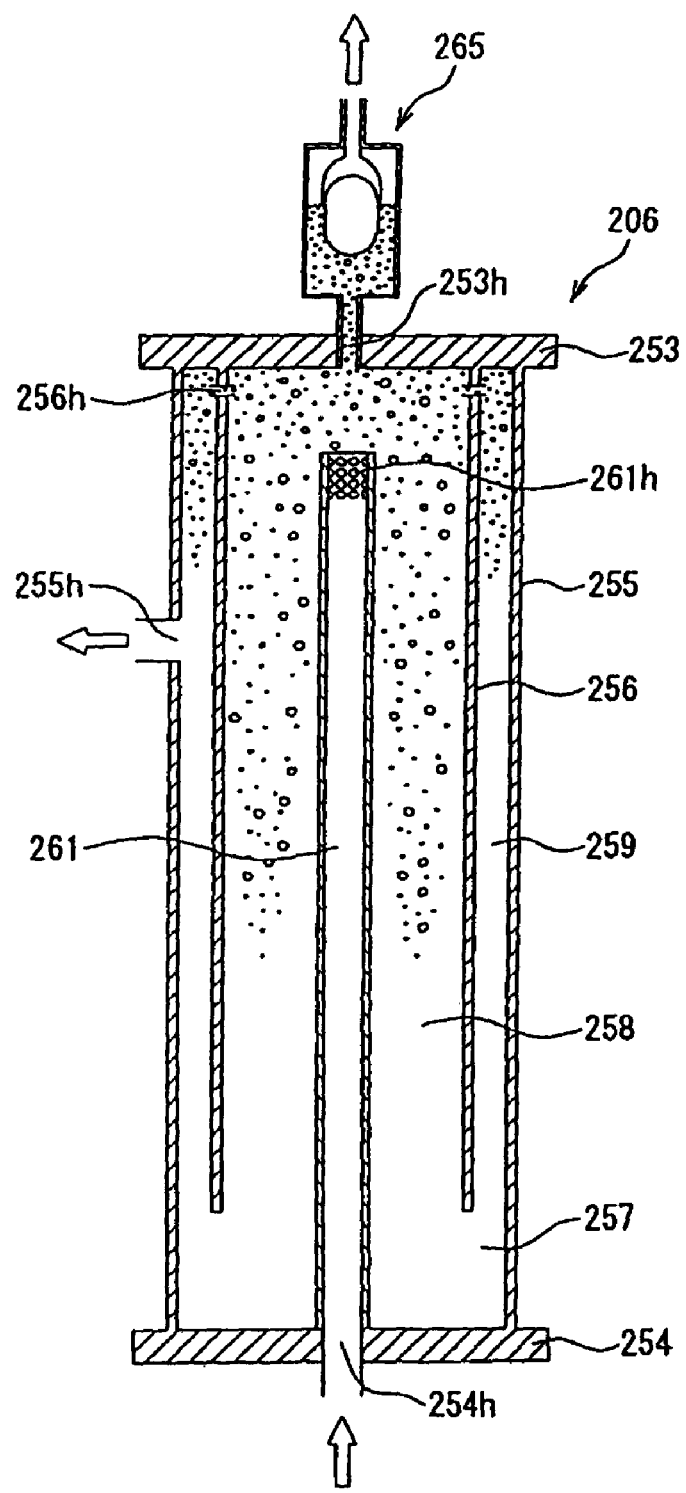
FIG. 6 is a longitudinal sectional view of the dissolution-promoting tub.
Figure 7:
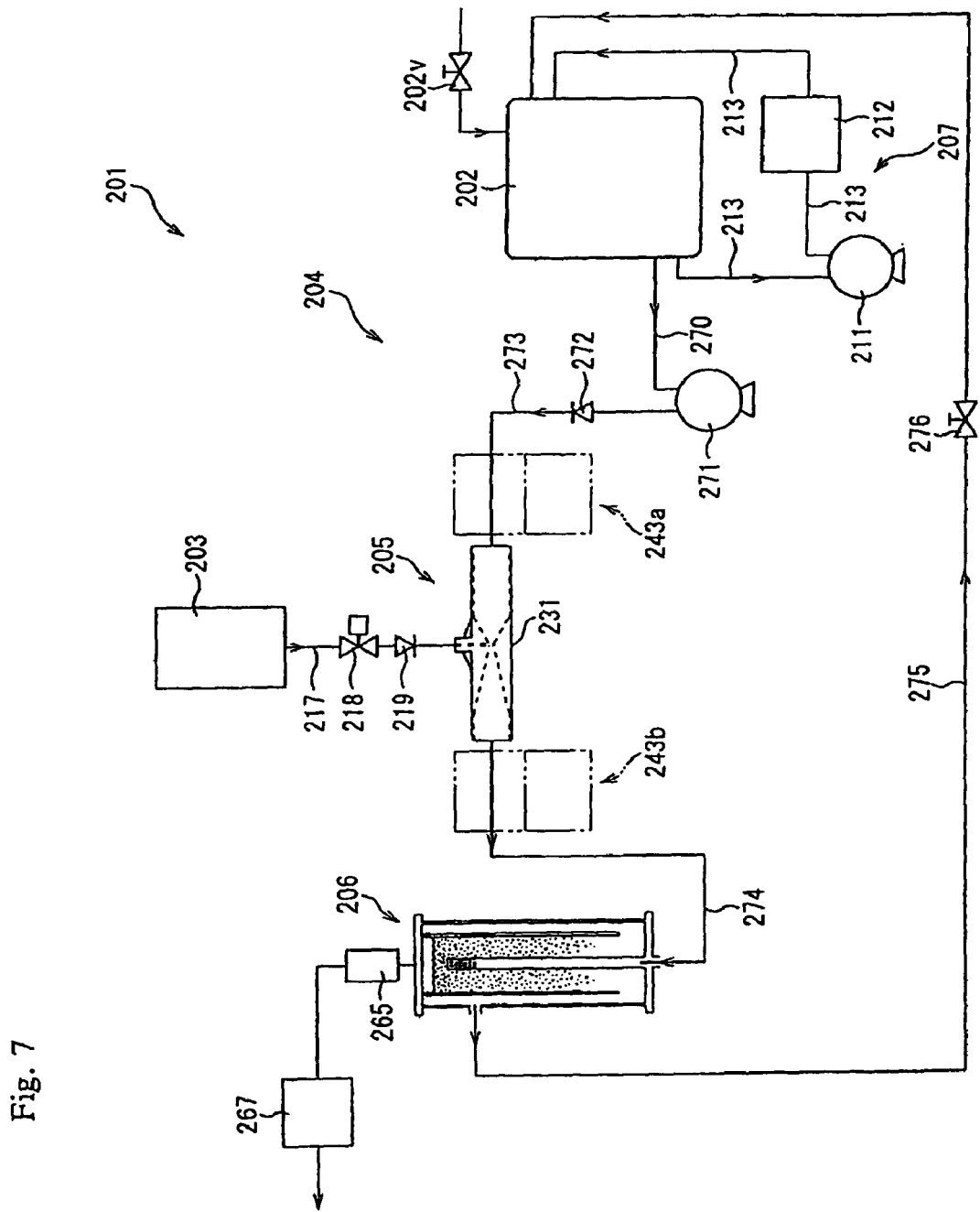
FIG. 7 is a schematic structural view of a gas-containing liquid generating device for performing comparative experiments.

The best modes for carrying out the present invention are described with reference to the drawings. FIG. 1 is a schematic structural diagram of a gas-containing liquid generator in which the gas/liquid mixing device can be installed. FIG. 2 is a front view of the gas/liquid mixing device. FIG. 3 is a left side view of the gas/liquid mixing device shown in FIG. 2. FIG. 4 is an X-X cross-sectional view of the gas/liquid mixing device shown in FIG. 3. FIG. 5 is a plan view of the gas/liquid mixing device with a part omitted. FIG. 6 is a longitudinal cross-sectional view of a dissolution-promoting tub. FIG. 7 is a schematic structural diagram of a gas-containing liquid generator for performing comparative experiments.

The following is a description, made with reference to FIG. 1, of a schematic structure of a gas-containing liquid generator in which a gas/liquid mixing device is installed. A gas-containing liquid generator 201 is essentially configured from a storage tank 202; a gas supply structure 203 for generating, collecting, or otherwise acquiring gas, and for supplying the gas after compressing or otherwise treating the gas as necessary; a circulation structure 204 for returning treated liquid extracted from the storage tank 202 back into the storage tank 202; a gas/liquid mixing device 205 and a dissolution-promoting tub 206 provided within the circulation structure 204; and a temperature-maintaining structure 207 provided to the storage tank 202. For the sake of convenience in the descriptions herein below, the circulation structure 204 is described last after the descriptions of the storage tank 202, the temperature-maintaining structure 207, the gas supply structure 203, the gas/liquid mixing device (gas/liquid mixing structure) 205, and the dissolution-promoting tub 206. The gas-containing liquid in the descriptions herein below is ozonated water. The ozonated water is created by mixing ozone as a gas in water, which is raw water (treated liquid). The addition of additives as necessary is not discouraged, but no additives are added to the raw water in the present embodiment. In cases in which a treated liquid other than water is used and/or cases in which a gas other than ozone (e.g., oxygen, hydrogen, nitrogen, atmospheric air, and other mixed gases) is used, it is possible to make appropriate modifications to the design which are suited to the type, properties, and other characteristics of the treated liquid and/or gas.

The storage tank 202 is configured so that raw water as a treated liquid can be poured in via a water intake valve 202$v$, as shown in FIG. 1. The purpose of the storage tank 202 is to store incoming raw water and a treated liquid or gas-containing liquid (ozonated water) that has been circulated via the circulation structure 204, described hereinafter. The treated liquid (gas-containing liquid) stored in the storage tank 202 is kept in a temperature range of, e.g., 5 to 15° C. by the temperature-maintaining structure 207. The temperature is set to this range because it is appropriate for enabling the ozone to be dissolved efficiently, and for preventing the dissolved ozone from readily escaping. If the temperature-maintaining structure 207 does not require the treated liquid or gas, the treated liquid or gas can be omitted. The temperature range in cases in which it is installed is preferably set with consideration given collectively to the type and properties of the treated liquid or gas (gases), whether or not additives are used, and other factors. The temperature-maintaining structure 207 is configured essentially from a pump 211 for extracting the treated liquid from the storage tank 202, and a cooling device 212 for cooling the extracted treated liquid, and supply tubes 213 for transmitting the treated liquid link the storage tank 202 to the pump 211, the pump 211 to the cooling device 212, and the cooling device 212 to the storage tank 202. In this configuration, the treated liquid (raw water and/or ozonated water) stored in the storage tank 202 is extracted from the storage tank 202 by the working of the pump 211 and is transferred to the cooling device 212. The cooling device 212 cools the transferred treated liquid to a temperature in a predetermined temperature and returns the liquid to the storage tank 202. The pump 211 is designed to operate only when the temperature of the treated liquid in the storage tank 202 as measured by a thermometer (not shown) exceeds the predetermined range and must be cooled. The reason the storage tank 202 is provided is because cooling is made possible by temporarily storing the treated liquid, and the treated liquid is stabilized, whereby ozone dissolution of the treated liquid is promoted by an action resembling fermentation. In cases of cold climates or the like in which there is a danger of the treated liquid freezing, for example, the configuration can use a heater in place of the cooling device or in addition to the cooling device to raise the temperature of the treated liquid.

The gas supply structure 203 in the present embodiment is a device for generating and supplying ozone. If the gas supply structure 203 is capable of supplying the necessary amount of ozone, there are no limitations to the ozone generation principles or the like under which the gas supply structure 203 operates. The ozone generated by the gas supply structure 203 is supplied to the gas/liquid mixing device 205 via an electromagnetic valve 218 and a check valve 219 provided in the path of a gas supply tube 217. If the gas mixed in the treated liquid is atmospheric air, for example, a compressed air device (compressor) or the like is the primary structural element of the ozone supply structure. In cases in which a plurality of gases are mixed, a device for generating, collecting, or otherwise acquiring the gases is used.

The details of the gas/liquid mixing device 205 are described with reference to FIGS. 1 through 5. The gas/liquid mixing device 205 is configured essentially from a Venturi tube 231, a gas supply pipe 239 for supplying ozone, and a magnetic circuit 243. The Venturi tube 231 and the gas supply pipe 239 are integrally configured from a magnetic permeable synthetic resin. The Venturi tube 231 has a pipe-shaped outward appearance for allowing the downstream (the left side of FIG. 2) passage of treated liquid transferred from upstream (the right side of FIG. 2). The hollow part longitudinally passing through the Venturi tube 231 is continuous upstream to downstream through an upstream large diameter channel 232, a squeezed slope channel 233, a small diameter channel 234, a open slope channel 235, and a downstream large diameter channel 236, in the stated order (see FIG. 4). The upstream large diameter channel 232 is connected to the small diameter channel 234 at a sudden axial angle of approximately 50 degrees via the squeezed slope channel 233 which is sloped toward the squeezed section, the narrowing direction, and then widens at a lesser axial angle of approximately 30 degrees by the open slope channel 235. The open slope channel 235 is connected to the downstream large diameter channel 236, which has the same outside diameter as the upstream large diameter channel 232. Additionally, the open end of the gas supply pipe 239 leads into the small diameter channel 234. The gas supply tube 217, which is communicated with the gas supply structure 203, is connected to the supply end of the gas supply pipe 239. A vacuous or nearly vacuous state is created in the center or downstream vicinity of the small diameter channel 234 by the change in pressure of the treated liquid, and the ozone filling the open end is therefore suctioned in and diffused into the turbulently flowing treated liquid. The numerical symbol 240 denotes a rib for reinforcing the connection between the Venturi tube 231 and the gas supply pipe 239.

The magnetic circuit 243 is fixed to the Venturi tube 231 by screws (not shown). The magnetic circuit 243 is configured from one magnet piece 245 and another magnet piece 246 facing each other from either side of the Venturi tube 231, and a connecting member 248, U-shaped in cross section (see FIG. 3), connecting the one magnet piece 245 to the other another magnet piece 246 and having the function of attaching the magnet pieces to the Venturi tube 231. The magnet piece 245 and the magnet piece 246 are preferably placed so that the most possible magnetic force lines (magnetic field) pass through the small diameter channel 234 (shown by the dashed lines in FIG. 3, see FIG. 5 as well) and/or the vicinity thereof particularly (the downstream side). In practice, there are technological difficulties associated with focusing the magnetic force lines on the small diameter channel 234 alone; therefore, the magnetic force lines pass through both the small diameter channel 234 and the vicinity of the small diameter channel 234. This is because it is believed that ozone can be dissolved most efficiently in the treated liquid by subjecting both the treated liquid (water) and the ozone (gas) to a magnetic force. The magnet piece 245 and the magnet piece 246 are configured from neodymium magnets having a magnetic force of approximately 7,000 Gauss. It is believed that a stronger magnetic force results in greater effects of ozone dissolution, and a magnetic force of at least 3,000 Gauss or greater is preferred. The reason magnets of 7,000 Gauss are used is because they are economical and easily procured. This is not to discourage the use of magnets having a magnetic force of 7,000 Gauss or greater (natural magnets, electromagnets, or the like). The connecting member 248 is configured from a member (e.g., iron) of high magnetic permeability ($\mu$) of magnetic force so as to suppress magnetic flux leakage and to focus the action of magnetic force on the treated liquid and the like as much as possible. One, two, or more magnets 231m may be provided outside of the Venturi tube 231 either in addition to or in place of the magnetic circuit 243. The purpose of this is to apply the magnetic force to the treated liquid and the gas, similar to the magnetic circuit 243. It is also to apply the magnetic force to the treated liquid (gas). The magnetic force of the magnet 231m is also at least 3,000 Gauss or greater, as described above. In the configuration described above, the treated liquid that has passed through the upstream large miameter channel 232 is compressed when passing through the squeezed diameter channel 233 and rapidly increases in water pressure, and the flow speed rapidly increases at the same time. The peak of the high pressure and high speed occurs in the small diameter channel 234. The treated liquid that has passed through the small diameter channel 234 rapidly decreases in pressure and speed in the open slope channel 235, and starts to flow turbulently due to the impact from colliding with the incoming treated liquid. The treated liquid then passes through and out of the downstream large diameter channel 236 and exits the gas/liquid mixing device 205. Beginning at the edges of the terminal end of the gas supply pipe 239, cavitation occurs in the periphery thereof as a result of the drop in pressure immediately after passing through the small diameter channel 234, and the gas (ozone) is dispersed into the treated liquid. The dispersed ozone is pulled into the turbulent flow of the treated liquid, formed into gas bubbles of various sizes, and subjected to a stirring action. The treated liquid (ozone) flowing through the small diameter channel 234 and at least the space downstream of the small diameter channel 234 is subjected to the magnetic effects of the working of the magnetic circuit 243 as well as the stirring action. Specifically, within a magnetic field, water pressure of the treated liquid is increased up to a pressure apex (peak), then reduced immediately after reaching the pressure apex, and ozone is supplied to treated liquid that has reached the pressure apex (and/or treated liquid immediately after reaching the apex). The stirring action and the magnetic action of the magnetic field have a synergistic effect, the result of which is that ozone is dissolved in the treated liquid, generating highly concentrated ozonated water (gas-containing liquid) having a high solubility. The effects of the above-described actions presume that ozone as a gas is dissolved in water as the treated water, but the same effects of the actions described above occur in cases in which a gas other than ozone is dissolved, such as oxygen, hydrogen, nitrogen, and various other mixed gases, for example.

The dissolution-promoting tub 206 is described with reference to FIGS. 1 and 6. The outward appearance of the dissolution-promoting tub 206 is configured from a cylindrical external wall 255, whose top and bottom ends are hermetically sealed by a top plate 253 and a bottom plate 254. Formed on the bottom surface of the top plate 253 is a cylindrical internal wall 256 hanging down from the bottom surface. The space enclosed by the internal wall 256 constitutes a storage chamber 258 for storing the treated liquid. The outside diameter of the internal wall 256 is set to be smaller than the outside diameter of the external wall 255, thereby forming an inter-wall flow channel 259 of a predetermined width between the internal wall 256 and the external wall 255. The bottom end of the internal wall 256 does not reach the bottom plate 254, and a gap of a predetermined width is formed between the bottom end and the bottom plate 254. This gap functions as a bottom end communicating channel 257. Specifically, the storage chamber 258 enclosed by the internal wall 256 communicates with the inter-wall flow channel 259 via the bottom end communicating channel 257. A plurality of communicating holes 256h, 256h, . . . are formed through the internal wall 256 near the top plate 253, and the storage chamber 258 and inter-wall flow channel 259 communicate via the communicating holes 256h. A long, thin hot liquid channel 261 is erected in the substantial center of the top surface of the bottom plate 254. The bottom end of the center of the hot liquid channel 261 is communicated with a liquid inlet hole 254h formed through the bottom plate 254, and the top end of the center is communicated with the storage chamber 258 via numerous small holes 261h, . . . formed in the top end of the hot liquid channel 261. The top end of the hot liquid channel 261 is positioned slightly lower than the communicating holes 256h of the internal wall 256. A liquid outlet hole 255h is formed through the external wall 255 at approximately one fourth of the height of the external wall 255 from the top. In other words, the inter-wall flow channel 259 is communicated with the exterior via the liquid outlet hole 255h.

A hot liquid hole 253h is formed in the substantial center of the top plate 253. The hot liquid hole 253h is communicated with the interior of a gas-liquid separator 265 placed on the exterior of the top plate 253. The gas-liquid separator 265 functions as a deaeration structure for separating and expelling treated liquid pushed up from the storage chamber 258 via the hot liquid hole 253h, and ozone removed from the treated liquid. The ozone separated by the gas-liquid separator 265 is decomposed and neutralized by a gas decomposition device 267, and then released to the exterior of the device. The ozone solubility in the treated liquid in the present embodiment is extremely high, and therefore an extremely small amount of ozone is removed, but the gas decomposition device 267 or another device is provided in order to further increase stability. For example, the gas decomposition device 267 may be omitted if a nontoxic gas is released, such as oxygen or nitrogen. The treated liquid fed into the storage chamber 258 by the hot liquid channel 261 is pushed down by the incoming treated liquid. The treated liquid that has reached the bottom end turns back and flows up into the inter-wall flow channel 259, and the liquid is released to the exterior via the liquid outlet hole 255h. Some of the treated liquid is pushed up into the gas-liquid separator 265. During this time, the ozone is dissolved in the treated liquid by an action resembling fermentation, generating ozonated water having a high solubility. In cases in which there is ozone that has not completely dissolved or was temporarily dissolved but then removed, the ozone rises into the gas-liquid separator 265 where it is separated. Therefore, ozone that cannot be completely dissolved can be mostly removed from the treated liquid. As a result, the ozone solubility of treated liquid that has passed through the dissolution-promoting tub 206 increases dramatically.

The circulation structure is described with reference to FIG. 1. The circulation structure 204 has the function of circulating the treated liquid (made into ozonated water from raw water) that has passed through the gas/liquid mixing device 205 and causing the treated liquid to pass through the gas/liquid mixing device 205 again. The reason the treated liquid is passed again through the gas/liquid mixing device 205 is to further increase the ozone solubility and concentration by mixing more ozone into the treated liquid that already contains dissolved ozone. The circulation structure 204 has a pump 271 as a drive source, and the storage tank 202 and dissolution-promoting tub 206 as primary structural elements. Specifically, the pump 271 pumps treated liquid into the gas/liquid mixing device 205 via a check valve 272 and a supply tube 273, the treated liquid having been extracted from the storage tank 202 via a supply tube 270. The treated liquid that has passed through the gas/liquid mixing device 205 is moved through a supply tube 274 and the dissolution-promoting tub 206 and is returned to the storage tank 202 via the supply tube 275 by pumping. The circulation structure 204 is configured so as to be capable of repeating the above-described steps as necessary. The number of circulations can be set freely in order to obtain the intended ozone solubility, ozone concentration, and other characteristics of the resulting ozonated water. The numerical symbol 276 denotes a valve provided in the path of the supply tube 275. The primary purpose of the valve 276 is to control the water pressure of the treated liquid passing through the small diameter channel 234 (see FIG. 3) of the gas/liquid mixing device 205, by means of the opening and closing of the valve.

Figure 8:
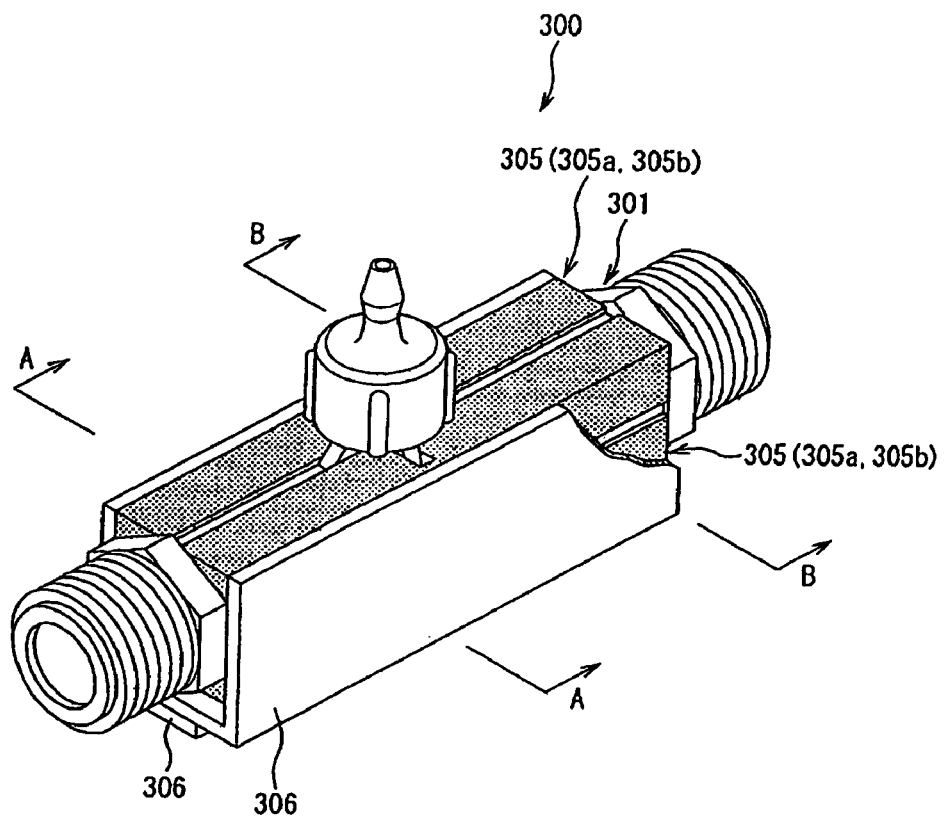
FIG. 8 is a perspective view of a gas/liquid mixing device.

Experimental examples are described with reference to FIGS. 1 and 7. The experimental examples shown herein are intended to demonstrate primarily that a significant difference in ozone solubility and concentration results from the difference between the magnet usage method according to the present invention and the usage method of the examples. In the present experimental example, the gas-containing liquid generator shown in FIG. 1 (herein below referred to as the "present device") is used as the device according to the present invention, and the gas-containing liquid generator shown in FIG. 8 (herein below referred to as the "comparative device") is used as an object of comparison. The comparative device is provided with essentially the same structure as the structure of the present device, and differs only in the position where the magnetic circuit 243 is mounted. Therefore, in FIG. 7, the same numerical symbols are used as those used in FIG. 1 except for the magnetic circuit, and the magnetic circuits shown in FIG. 7 are denoted by the numerical symbol 243*a* for the one upstream of the gas/liquid mixing device 205, and the numerical symbol 243*b* for the one downstream. To rephrase, the present device shown in FIG. 1 comprises a gas/liquid mixing device 205 integrated with the magnetic circuit 243, and the comparative device shown in FIG. 8 is configured so that the magnetic circuit 243*a* can be simultaneously or selectively mounted on and removed from the supply tube upstream of the gas/liquid mixing device 205, while the magnetic circuit 243*b* can also be simultaneously or selectively mounted on and removed from the supply tube downstream. The treated liquid is well water and the gas is ozone, and ozonated water is generated as the gas-containing liquid. Model no. 384 made by Mazzei Injector Corporation is used as the gas/liquid mixing device 205, and 7000 Gauss circuits are used as the magnetic circuits.

Figure 9:
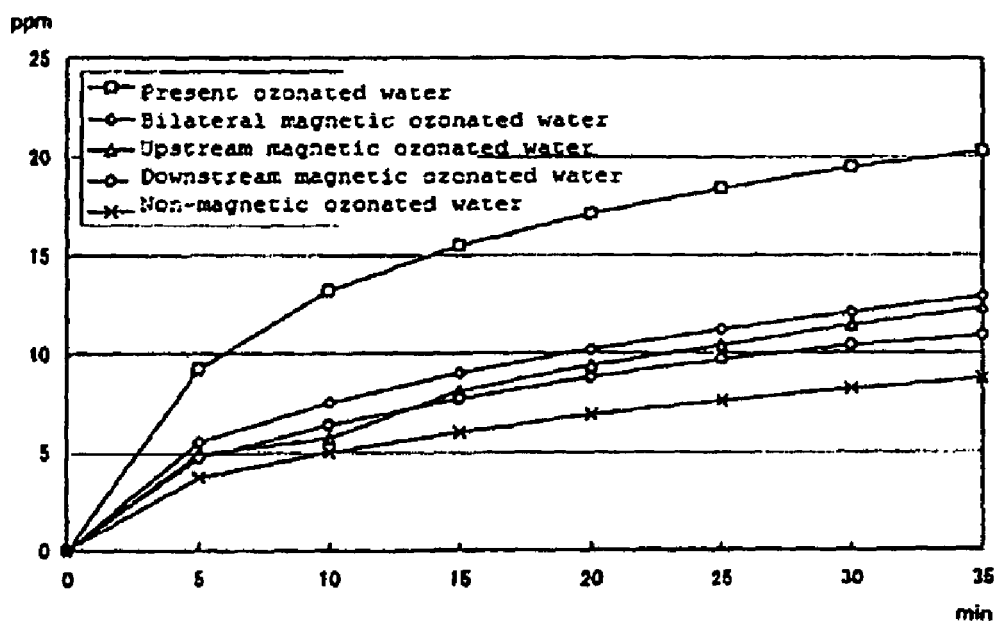
FIG. 9 is a graph of ozone concentration versus time.
Figure 10:
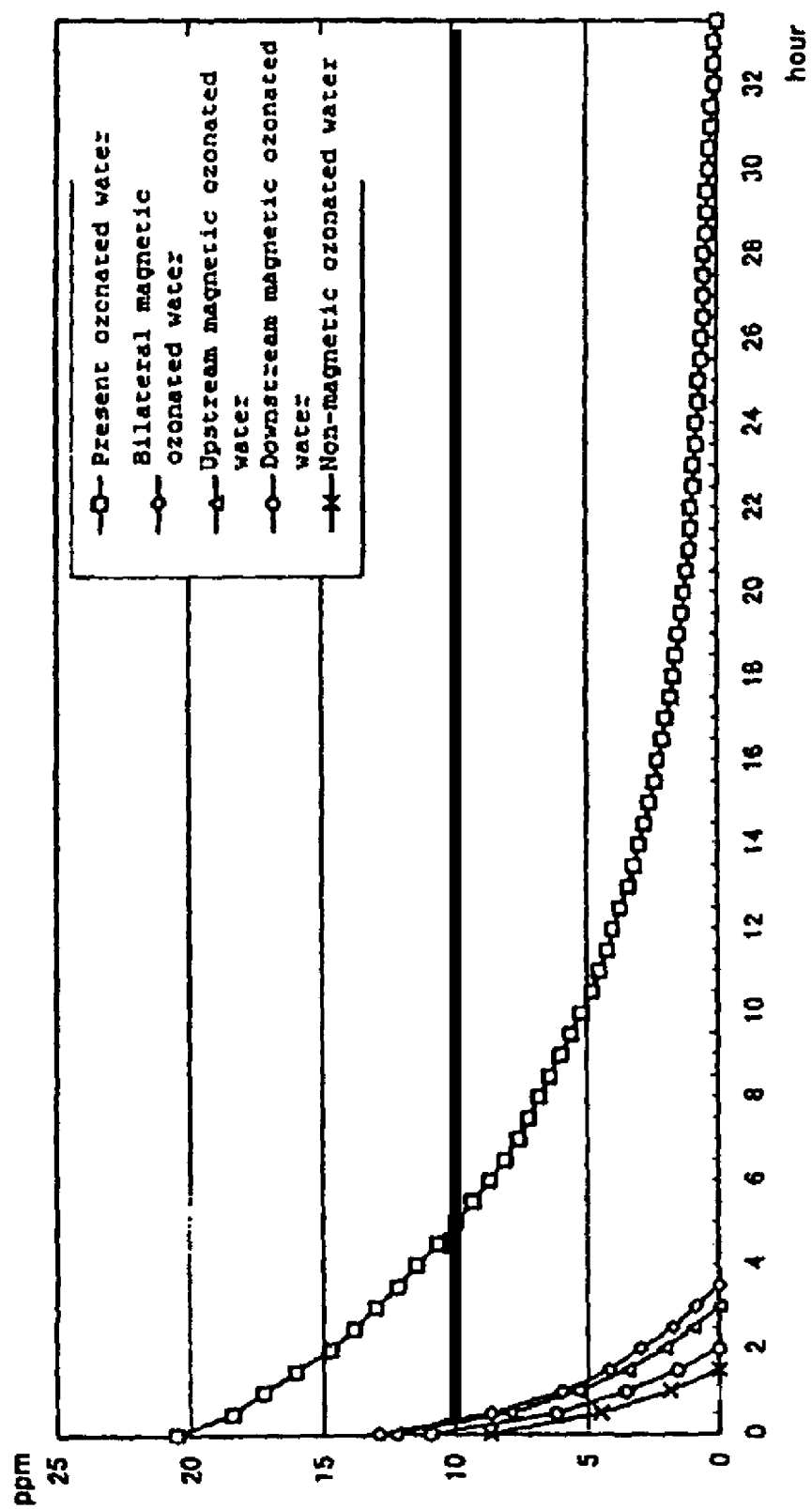
FIG. 10 is another graph of ozone concentration versus time.

A concentration comparison experiment is described with reference to FIGS. 9 and 10. FIG. 9 shows the relationship between ozone concentration and concentration increasing time in the ozonated water. FIG. 10 shows the time taken for the ozone concentration of the ozonated water shown in FIG. 9 to reach zero after the generator stops operating. The FIGS. 9 and 10 show that the longer it takes to reach zero, the higher the ozone solubility. In FIGS. 9 and 10 the square symbols indicate ozonated water generated using the present device (herein below referred to as "present ozonated water"), the X symbols indicate ozonated water generated using a gas/liquid mixing device in which only the magnetic circuits have been removed from the comparative device (herein below referred to as "non-magnetic ozonated water"), the triangle symbols indicate ozonated water generated by the gas/liquid mixing device 205 and the magnetic circuit 243*a* in the comparative device (herein below referred to as "upstream magnetic ozonated water"), the circle symbols indicate ozonated water generated by the gas/liquid mixing device 205 and the magnetic circuit 243*b* in the comparative device (herein below referred to as "downstream magnetic ozonated water"), and the diamond symbols indicate ozonated water generated by the gas/liquid mixing device 205 and both the magnetic circuit 243*a* and magnetic circuit 243*b* in the comparative device (herein below referred to as "bilateral magnetic ozonated water"). The temperature of the treated liquid was 5° C., the surrounding humidity was 36 to 43%, and the surrounding temperature was 17° C.

The present ozonated water reached an ozone concentration of 20 ppm at a generation time of 35 minutes after the generator started operating as shown in FIG. 9, but under the same conditions, the non-magnetic ozonated water only increased to an ozone concentration of approximately 8 ppm, the downstream magnetic ozonated water to an ozone concentration of approximately 11 ppm, the upstream magnetic ozonated water to an ozone concentration of approximately 12 ppm, and the bilateral magnetic ozonated water to an ozone concentration of approximately 13 ppm. It is therefore clear that, first, providing magnetic circuits yields a higher ozone concentration than not providing magnetic circuits, and second, that even if the same magnetic circuits are provided, integrating the circuits with the gas/liquid mixing device can yield an ozone concentration of at least 7 ppm higher than providing the magnetic circuits separate from the gas/liquid mixing device. In other words, the results were that the present ozonated water had an ozone concentration approximately 54% ((20−13)/13×100) higher than the bilateral magnetic ozonated water.

After having reached 20 ppm, the ozone concentration of the present ozonated water took 32 hours or longer to reach zero as shown in FIG. 10, whereas the ozone concentration of the bilateral magnetic ozonated water took approximately only 3.5 hours to reach zero from 13 ppm, which was the longest of all the types of ozonated water used for comparison. Therefore, the conclusion is that the present ozonated water contained ozone for nearly 10 times as long as the bilateral magnetic ozonated water. In other words, with the same amount of ozone added over the same amount of time, the present ozonated water retained the dissolved ozone for nearly 10 times as long as the bilateral magnetic ozonated water. The high level of ozone solubility in the present ozonated water is demonstrated in a clear manner.

Figure 11:
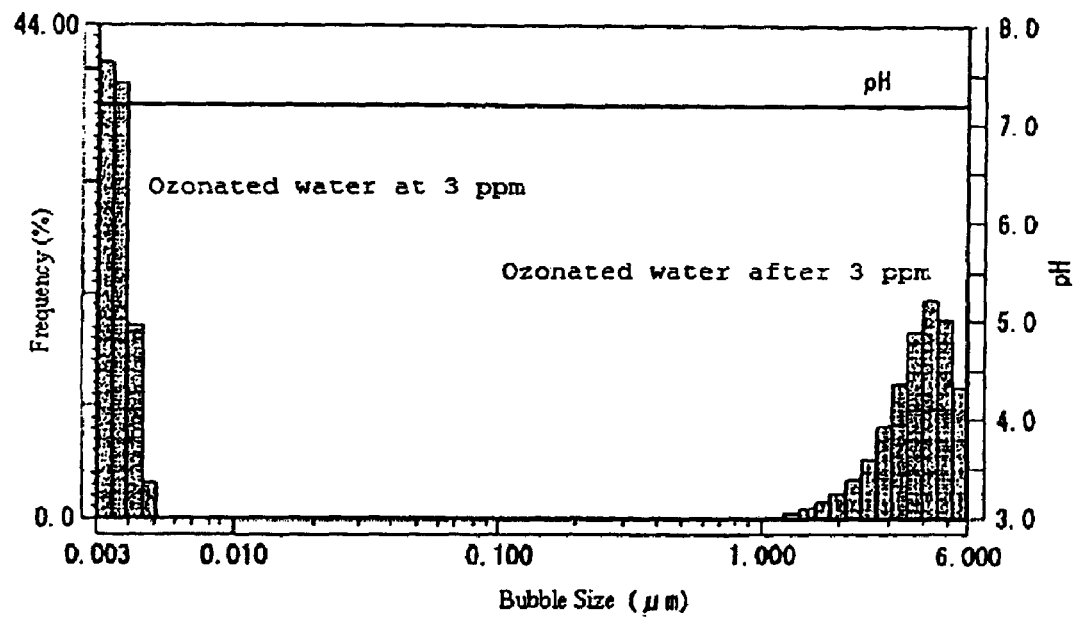
FIG. 11 is graph of showing at left ozonated water frequency versus bubble size at 3 ppm and at right the same after 3 ppm.
Figure 12:
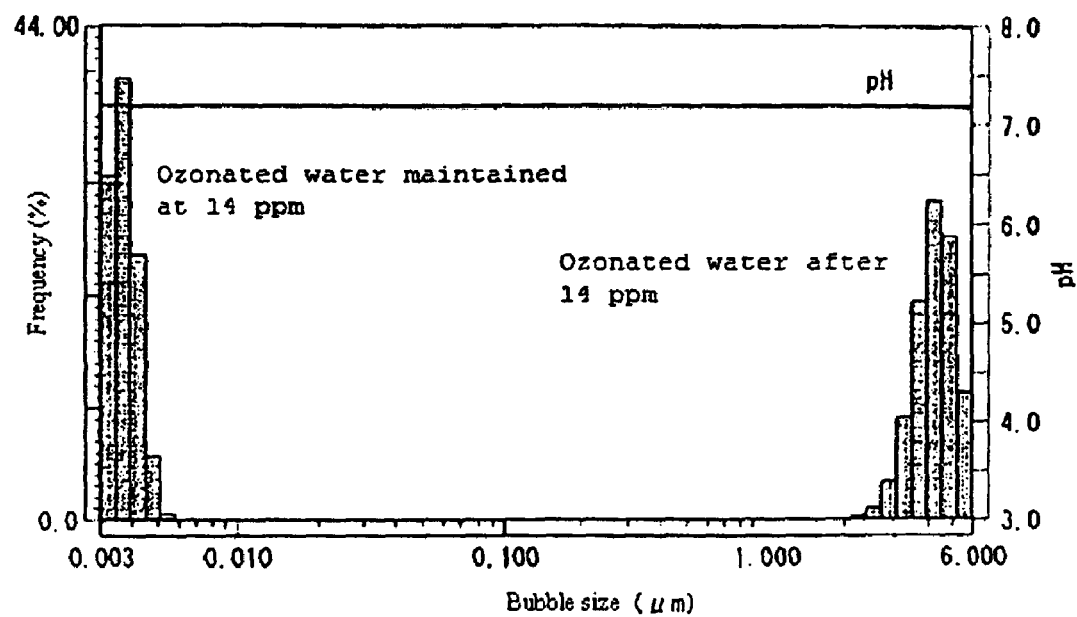
FIG. 12 is graph of showing at left ozonated water frequency versus bubble size at 14 ppm and at right the same after 14 ppm.

The following is a description, made with reference to FIGS. 11 and 12, of an experiment for measuring the size of ozone gas bubbles in the present ozonated water. FIGS. 11 and 12 show the distribution of ozone gas bubble size in the present ozonated water (refer to the vertical axes on the left sides). In the present measuring experiment, four types of present ozonated water were measured from the relationship between ozone concentration and ozone concentration maintenance time. First, the ozone concentration was categorized into two levels, 3 ppm and 14 ppm, and these concentrations were then further categorized into ozonated water immediately after the concentration was reached (herein below referred to respectively as "ozonated water after 3 ppm" and "ozonated water after 14 ppm"), and ozonated water in which the concentration was maintained for 15 minutes after the concentration was reached (herein below referred to as "ozonated water maintained at 3 ppm" and "ozonated water maintained at 14 ppm"). In other words, the four types of ozonated water, which are the "ozonated water after 3 ppm," the "ozonated water maintained at 3 ppm," the "ozonated water after 14 ppm," and the "ozonated water maintained at 14 ppm," are the objects of measurement pertaining to the present measurement experiment. The raw water in the present ozonated water used in the present measurement experiment was pure water obtained by filtering tap water through a reverse osmosis membrane capable of absolution filtration of 0.05 μm (50 nm) microparticles. The device used to obtain pure water in the present experiment was an ultrapure water device made by Sena Co., Ltd (product name: Model UHP). Since the tap water contains 50 nm or more of impurities (iron or magnesium, for example), even when ozonated water generated from unfiltered raw water is the object of measurement, it is possible for the impurities contained therein to be measured and for measurement errors to occur; therefore, the ultrapure water device is used to remove impurities by filtration in advance, thereby ensuring that the size of the ozone gas bubbles can be measured correctly. The same can be said of raw water other than tap water; e.g., well water or river water. The measuring instrument used to measure the ozone gas bubble size is a dynamic light scattering-type particle size distribution measurement device (model LB500 made by Horiba, Ltd). Needless to say, if there are means whereby the size of ozone gas bubbles can be correctly measured without filtering impurities from raw water, the measurements can be performed using those means.

First, the ozonated water after 3 ppm and the ozonated water maintained at 3 ppm are considered with reference to FIG. 11. The graph at the right end of FIG. 11 shows the ozonated water after 3 ppm, and the graph at the left end shows the ozonated water maintained at 3 ppm. It was clear that the ozonated water after 3 ppm contained ozone gas bubbles having a size of 1.3 µm (1300 nm) to 6.0 µm (6000 nm). It was also clear that the ozonated water maintained at 3 ppm contained ozone gas bubbles having a size of 0.0034 nm (3.40 nm) to 0.0050 µm (5.00 nm).

Next, the ozonated water after 14 ppm and the ozonated water maintained at 14 ppm are considered with reference to FIG. 12. The graph at the right end of FIG. 12 shows the ozonated water after 14 ppm, and the graph at the left end shows the ozonated water maintained at 14 ppm. It was clear that the ozonated water after 14 ppm contained ozone gas bubbles having a size of 2.3 µm (2300 nm) to 6.0 µm (6000 nm). It was also clear that the ozonated water maintained at 14 ppm contained ozone gas bubbles having a size of 0.0034 nm (3.40 nm) to 0.0058 µm (5.80 nm).

The first point made clear from the experiments described above is that even though these types of ozonated water have the same concentration, the size of the ozone gas bubbles contained therein (herein below referred to as "gas bubble size") differs between the ozonated water immediately after reaching the concentration (subsequent ozonated water) and the ozonated water in which the concentration has been maintained for a predetermined amount of time (maintained ozonated water). In the case of 3 ppm ozonated water, the minimum value of the gas bubble size of the subsequent ozonated water is 260 times (1300/5.0) the maximum value of the gas bubble size of the maintained ozonated water. This same ratio is approximately 400 times (2300/5.8) in the case of 14 ppm ozonated water. In other words, the gas bubble size can be reduced by maintaining the concentration for a predetermined amount of time; i.e., by circulating the ozonated water which is the treated liquid. If the ozone gas bubbles have a gas bubble size of less than 50, the gas bubbles can be stably suspended in an aqueous solution. According to the ozonated water generation method of the present invention, it was clear that it is possible to obtain ozonated water containing ozone gas bubbles having an ozone gas bubble size R of less than 50 nm (0<R<50 nm); i.e., it is possible to obtain highly soluble ozonated water. This is the second point made clear from the experiments. According to the experiments, the lowest actually measured value of the ozone gas bubble size was 3.4 nm, and values lower than this were not measured. The reason no such values were measured is believed to be because of the limitations of the measuring capacity of the measurement device. Since the ozone gas bubble size R was smaller after the concentration was maintained than immediately after the concentration was reached, it is easily feasible that there could be ozone gas bubbles having a size R of nearly zero as an extension of the size reduction.

pH measuring experiments were conducted on the four types of ozonated water; namely, the "ozonated water after 3 ppm," the "ozonated water maintained at 3 ppm," the "ozonated water after 14 ppm," and the "ozonated water maintained at 14 ppm." The results are shown by line graphs in FIGS. 11 and 12 (refer to the vertical axes on the right sides). All of the types of ozonated water exhibited a pH of approximately 7.3 before and after ozone dissolution. Specifically, it was clear that ozone dissolution did little to change the pH of the raw water. Since the well water and tap water were substantially neutral (pHs of 6.5 to 7.5), it was clear that the present ozonated water generated by the gas/liquid mixing method would be neutral without the addition of any additives for regulating pH. In cases in which the raw water is alkaline, however, alkaline ozonated water could possibly be generated because ozone dissolution does not change the pH of the ozonated water.

The following is a summary of the results of the experiment described above. The present ozonated water, which is an object of the above-described experiment, is generated by a mixing of gas and liquid wherein ozone is mixed with raw water without the addition of any additives. Furthermore, because of the high ozone solubility, the ozone does not readily escape even at ordinary pressure. Therefore, the ozonated water can be safely distributed for livestock or human consumption, for example, being that there are no additives and no ozone loss. Since the ozone concentration can be made extremely high, use of the present ozonated water can yield more efficient washing, sterilization, and other effects. The ozonated water can also be used in semiconductor washing, which is a typical example of wafer washing; clothing washing, vaccine inactivation, and other applications.

The experiment described above is performed on ozonated water and was the result of circulating the treated water via the circulation structure 21 and repeatedly supplying ozone, but ozonated water generated by passing the treated water only once (one pass) through the gas/liquid mixing device 205 without using the circulation structure 21 will presumably be highly soluble as well. It is also possible to increase the dissolved oxygen concentration of aquaculture ponds and to purify rivers, ponds, or other bodies of water having poor water quality by using water as the treated liquid and oxygen as the gas. Furthermore, the drinking by humans and animals of gas-containing liquid (water) containing hydrogen instead of oxygen can be expected to have the effect of removing active oxygen in the body.

Figure 13:
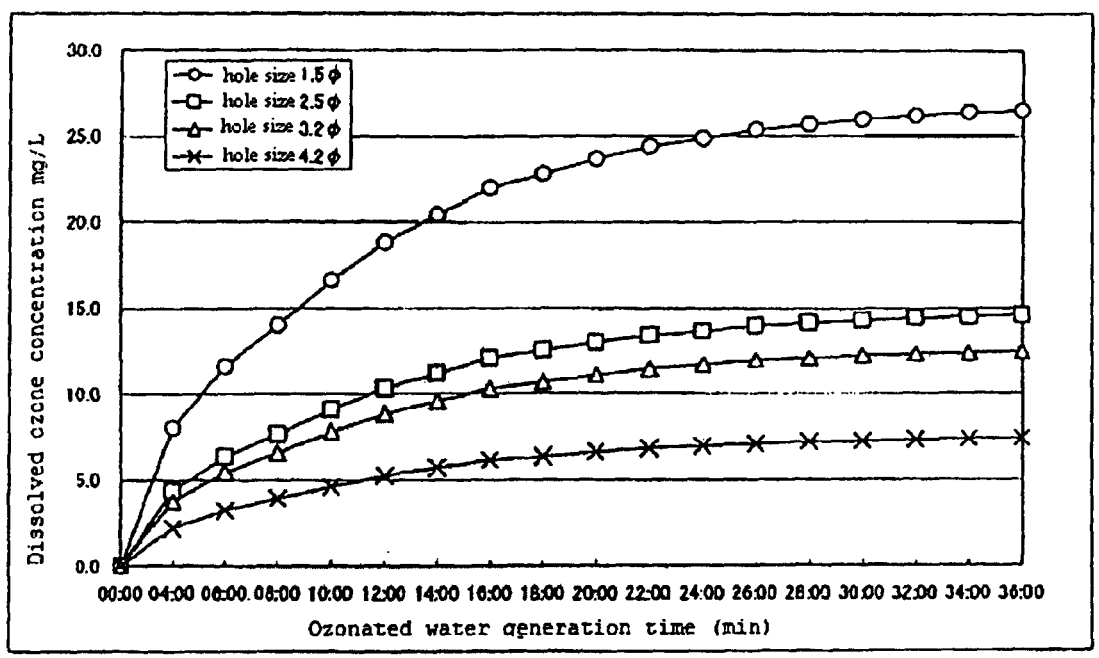
FIG. 13 is a chart showing graphs of dissolved ozone concentration versus ozonated water generation time.

Referring to FIG. 13, an experiment was conducted on the relationship between the inside diameter (hole diameter) of the small diameter section and gas/liquid mixing efficiency. For the hole diameter experiment, four types of gas/liquid mixing structures having different hole diameters were prepared, and time-series changes in ozone concentration were measured while the flow rate of the treated water flowing through each structure was kept constant. The four types of gas/liquid mixing structures were arrayed such that two structures of the same diameter were aligned side by side. There were four types of gas/liquid mixing structures prepared, and a total of eight altogether. The reason there are two rows of structures is because since the hole diameters are reduced as described hereinafter, a reduction in the amount of treated water flowing through cannot be avoided, and the gas/liquid mixing structures are connected in parallel to compensate for the deficiency with two combined through-flows. The four types of hole diameters include 4.2 mm (appropriately referred to as the "hole diameter 4.2"), 3.2 mm (appropriately referred to as the "hole diameter 3.2"), 2.5 mm (appropriately referred to as the "hole diameter 2.5"), and 1.5 mm (appropriately referred to as the "hole diameter 1.5"). The temperature of the treated water was adjusted so as to be approximately 10° C. The objects of the experiment were ozone as the gas, and water as the treated water. The measurement results are shown in FIG. 13. The magnetic force of the magnets used was approximately 3000 Gauss.

The ozone concentration was observed to be higher with the hole diameter 3.2 than the hole diameter 4.2, higher with the hole diameter 2.5 than the hole diameter 3.2, and higher with the hole diameter 1.5 than the hole diameter 2.5, as shown in FIG. 13. In other words, the smaller the hole diameter, the more the ozone concentration can be increased. The ozone concentration differs with temperature and other factors, but assuming in this case that the necessary ozone concentration is 10 mg/L(ppm), for example, it was clear that the three hole diameters aside from the hole diameter 4.2; namely, the hole diameters 3.2, 2.5, and 1.5, were hole diameters that made it possible for the necessary ozone concentration to be achieved. The ozone concentration with the hole diameter 4.2 reached approximately 7.5 mg/L at an ozonated water generation time of approximately 22 minutes, but no increase in concentration was observed thereafter. Therefore, the necessary ozone concentration of 10 mg/L was not achieved with the hole diameter 4.3. The ozone concentration with the hole diameter 3.2 surpassed 10 mg/L at an ozonated water generation time of approximately 16 minutes, and continued to slowly increase thereafter. The ozone concentration with the hole diameters 2.5 and 1.5 reached 10 mg/L at approximately 12 and 5 minutes respectively, and continued to increase thereafter. It was concluded from summarizing the above circumstances that the hole diameter is preferably set to approximately 3 mm or less in order to obtain highly concentrated ozonated water in a short amount of time. By analogizing from the results with the hole diameters 2.5 and 1.5, it was concluded that even more highly concentrated (e.g., 15 mg/L as shown in the present experiment) ozonated water can be obtained with a hole diameter of 2 mm or less. Therefore it was concluded that the hole diameter for obtaining highly concentrated ozonated water is preferably 3 mm or less, and even more preferably 2 mm or less. This pattern applies not only to ozone, but also to oxygen, hydrogen, nitrogen, and other mixed gases.

The following is a speculation of the reason that reducing the hole diameter is effective in generating highly concentrated ozonated water. It is believed, as described in the previous paragraph entitled "Operational Effects of the Gas/Liquid Mixing Device," that beginning at the edges of the terminal end of the gas supply pipe 239, cavitation occurs in the periphery thereof as a result of the drop in pressure immediately after passing through the small diameter channel 234 (see FIG. 4), and the gas (ozone) is dispersed into the treated liquid. However, it is also believed that when the hole diameter is too large, the cavitation occurring in the periphery of the edges does not occur in areas far from the edges. It is safe to assume that if the hole diameter is sufficiently small, cavitation occurs throughout substantially the entire small diameter channel, and the concentration is increased as a result.

The results of the dissolved oxygen experiment are described with reference to Tables 1 through 3. Measurements were taken of the amounts of dissolved oxygen (mg/L) in oxygenated water (oxygen+water) and the ozonated water (ozone+water) generated using two of the above-described gas/liquid mixing structures having hole diameters of 2.5 connected in parallel. A DO (dissolved oxygen, JIS K-0102) analyzer "B-100S" made by Iijima Electronics Corporation was used to take the measurements. Since the effective measurement range of the analyzer is 0.0 to 30.0 mg/L, numerical values exceeding 30.0 mg/L were used as reference values. Table 1 shows the amounts of dissolved oxygen in the ozonated water having the concentrations shown in the table, and Table 2 shows the amounts of dissolved oxygen when only oxygen is dissolved. The measurement method is "JIS K0101 24.4." Furthermore, Table 3 shows the saturated amounts of dissolved oxygen (mg/L) at atmospheric pressure (1 atmosphere). The water was accurately regulated at 20° C. using a constant temperature tub.

TABLE 1

| Item | Raw Water | Ozonated water 10 ppm | Ozonated water 16 ppm |
|---|---|---|---|
| dissolved oxygen content (mg/L) | 8.5 | 35 | 46 |

TABLE 2

| Item | Raw Water | Oxygenated water |
|---|---|---|
| dissolved oxygen content (mg/L) | 8.5 | 43 |

TABLE 3

| Temperature (° C.) | Saturated Amount of Dissolved Oxygen (mg/L) |
|---|---|
| 0 | 14.16 |
| 5 | 12.37 |
| 10 | 10.92 |
| 15 | 9.76 |
| 20 | 8.84 |
| 25 | 8.10 |
| 30 | 7.52 |

First, Table 1 and Table 3 will be compared. The measurements were taken based on raw water (tap water) having a dissolved oxygen content of 8.5 mg/L. Ozonated water was generated by dissolving oxygen gas (oxygen concentration 90%, flow rate 4 L/min) and mixed gas containing some ozonated oxygen gas (ozonated using an ozonizer outputting 20 g/h). When the dissolved ozone concentration of the ozonated water reached 10 ppm, the dissolved oxygen concentration was measured to be 35 mg/L. The dissolved oxygen content in the raw water at this time was 8.5 mg/L (substantially consistent with the saturated amount of dissolved oxygen at 20° C.), but by dissolving the aforementioned mixed gas containing ozone ($O_3$), the dissolved oxygen content was successfully increased to 35 mg/L (in other words, a supersaturated dissolved state was achieved), which is the reference value but is substantially four times the saturated amount of dissolved oxygen (20° C.) Similarly, when the dissolved ozone concentration of the oxygen and ozone mixed gas was increased to 16 ppm, the dissolved oxygen content increased to 46 mg/L, which was a reference value exceeding the measurement range of the dissolved oxygen concentration gauge, but was substantially 5.2 times the saturated amount of dissolved oxygen (20° C.). In other words, a supersaturated dissolved state was achieved for the oxygen. The ozonated water and oxygenated water were both left for one hour in a 20° C. constant temperature tub open to the atmosphere, after which no substantial changes in concentration were observed. This respect differs from the change in ozonated water concentration shown in FIG. 17. Specifically, it is believed that since ozone has low solubility in water, the ozone concentration after the ozonated water was generated gradually decreased, and since oxygen is highly soluble in water, the oxygen concentration after the oxygenated water was generated did not substantially change.

Table 2 and Table 3 will now be compared. As a result of dissolving oxygen in raw water (tap water) having a dissolved oxygen content of 8.5 mg/L, the reference value of 43 mg/L was obtained. This value is substantially 4.9 times the saturated amount of dissolved oxygen (20° C.)

Figure 14:
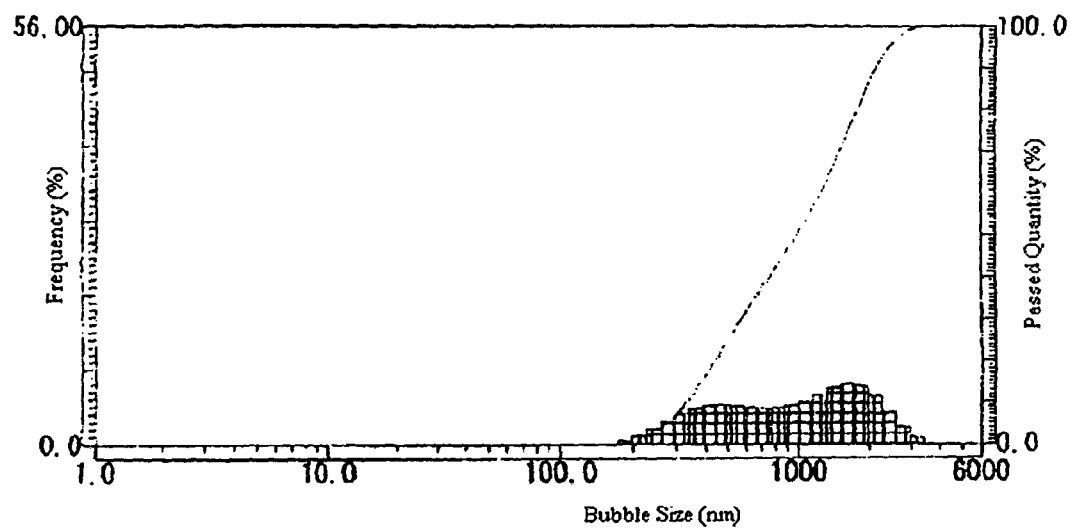
FIG. 14 is a graph of a size distribution of oxygen gas in raw water.
Figure 15:
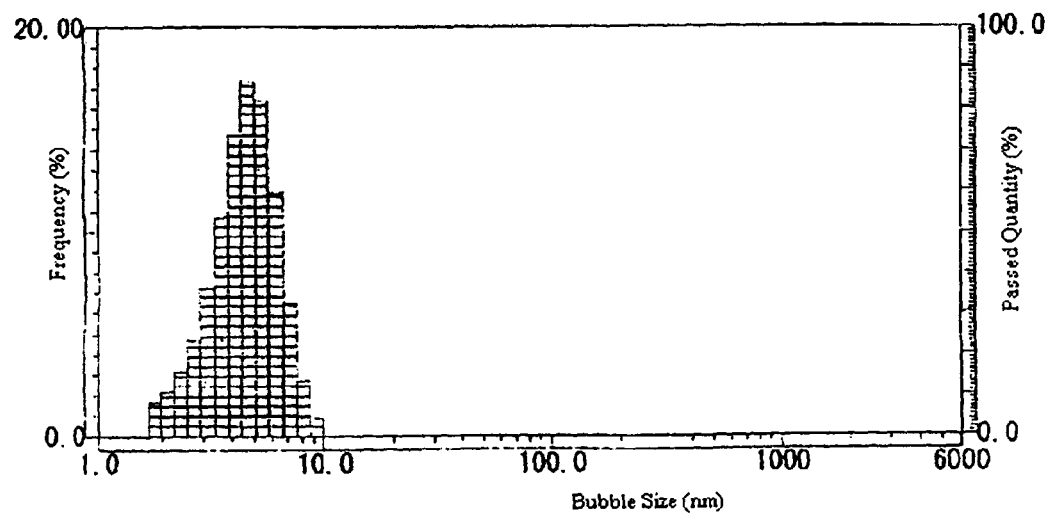
FIG. 15 is a graph of a size distribution of oxygen gas bubbles contained in oxygenated water.

Next, observations were made of the size of the oxygen gas bubbles contained in the raw water and oxygenated water (nano/picobubbles) shown in Table 2 described above. The gauge used was a dynamic light scattering-type particle size distribution measurement device (model LB550 made by Horiba, Ltd). FIG. 14 shows the size distribution of oxygen gas bubbles contained in raw water (22.6° C.), and FIG. 15 shows the size distribution of oxygen gas bubbles contained in oxygenated water (22.7° C.).

Figure 17:
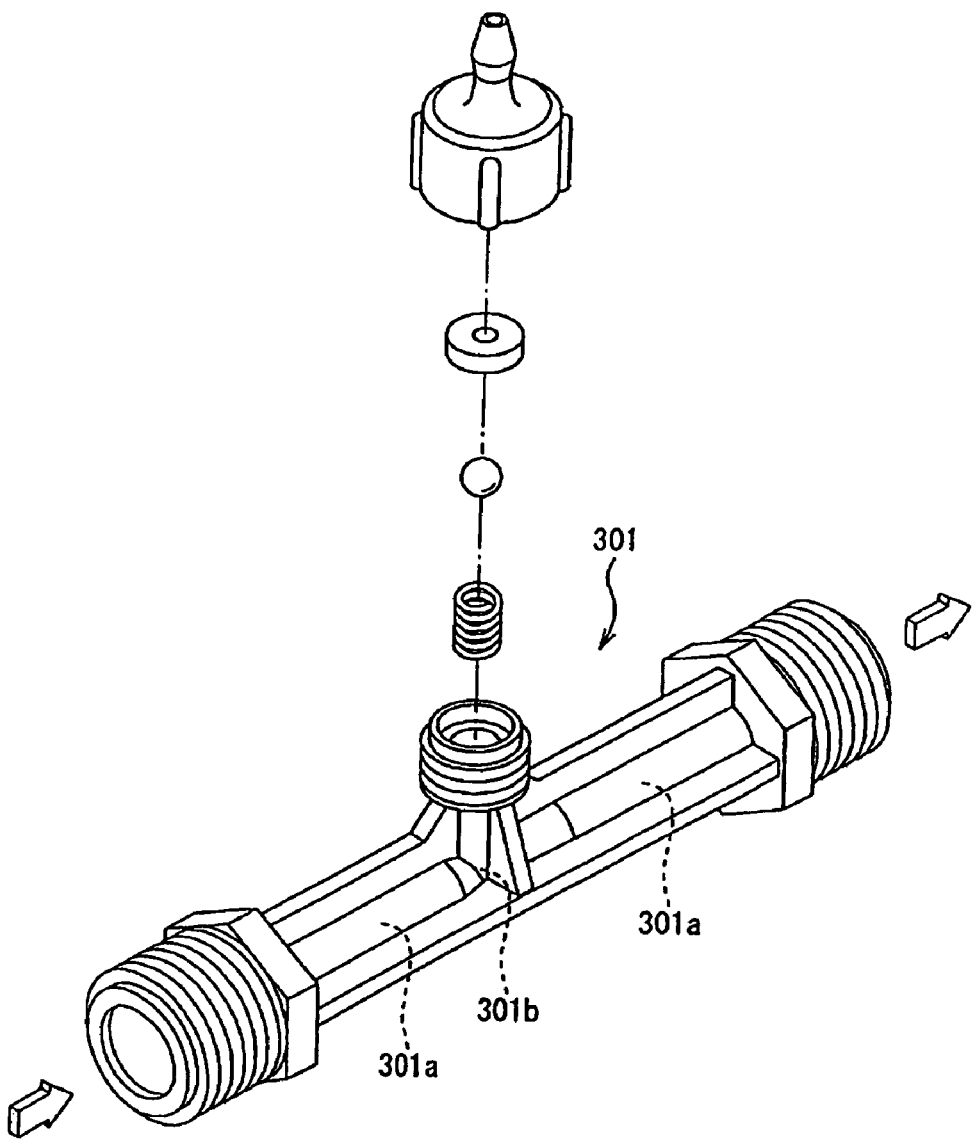
FIG. 17 is a perspective view of a Venturi tube.

The size of oxygen gas bubbles (raw water) shown in FIG. 14 is substantially 200 nm or greater, while the size of oxygen gas bubbles (oxygenated water) shown in FIG. 17 exhibits a bell curve centered around approximately 4.0 nm, wherein most of the data is 10 nm or less. The smallest bubble size successfully measured was 2.0 nm. From this data it was concluded that the use of the gas/liquid mixing structure according to the present invention makes it possible to generate oxygen gas bubbles whose sizes are at least nanometer units. Taking this together with the assumption that the above-described oxygen gas bubble size in ozonated water was in nanometer units, it is safe to assume that even with gases other than ozone or oxygen (for example, hydrogen, nitrogen, and other mixed gases), it is possible to generate gas bubbles having a size of at least nanometer units, and even picometer units or angstrom units.

Figure 16:
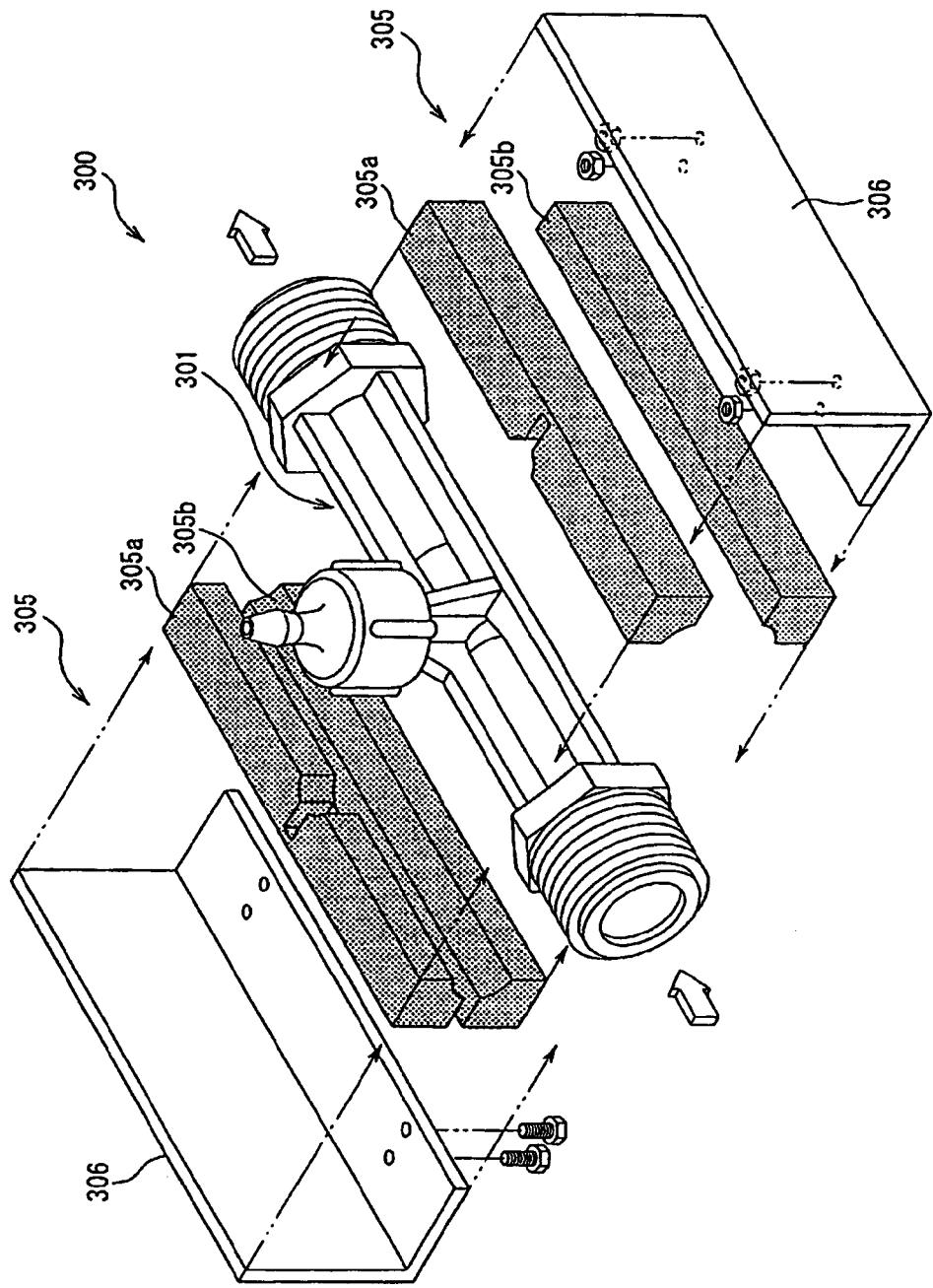
FIG. 16 is an exploded perspective view of a gas/liquid mixing device.
Figure 18:
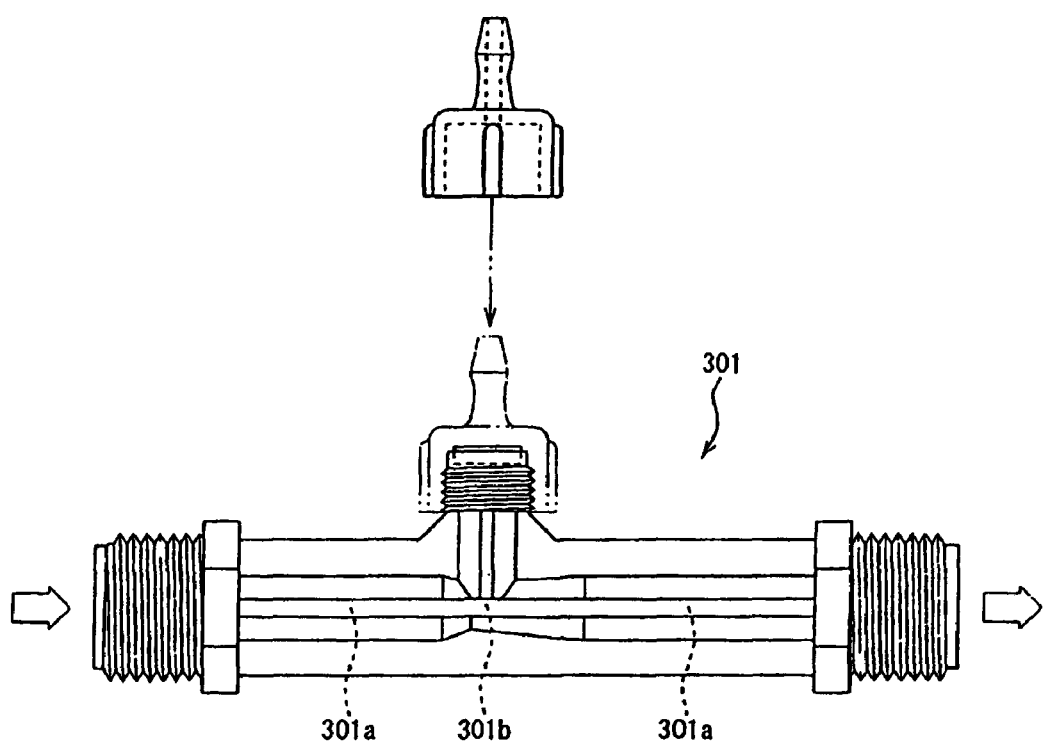
FIG. 18 is a front view of a Venturi tube.
Figure 19:
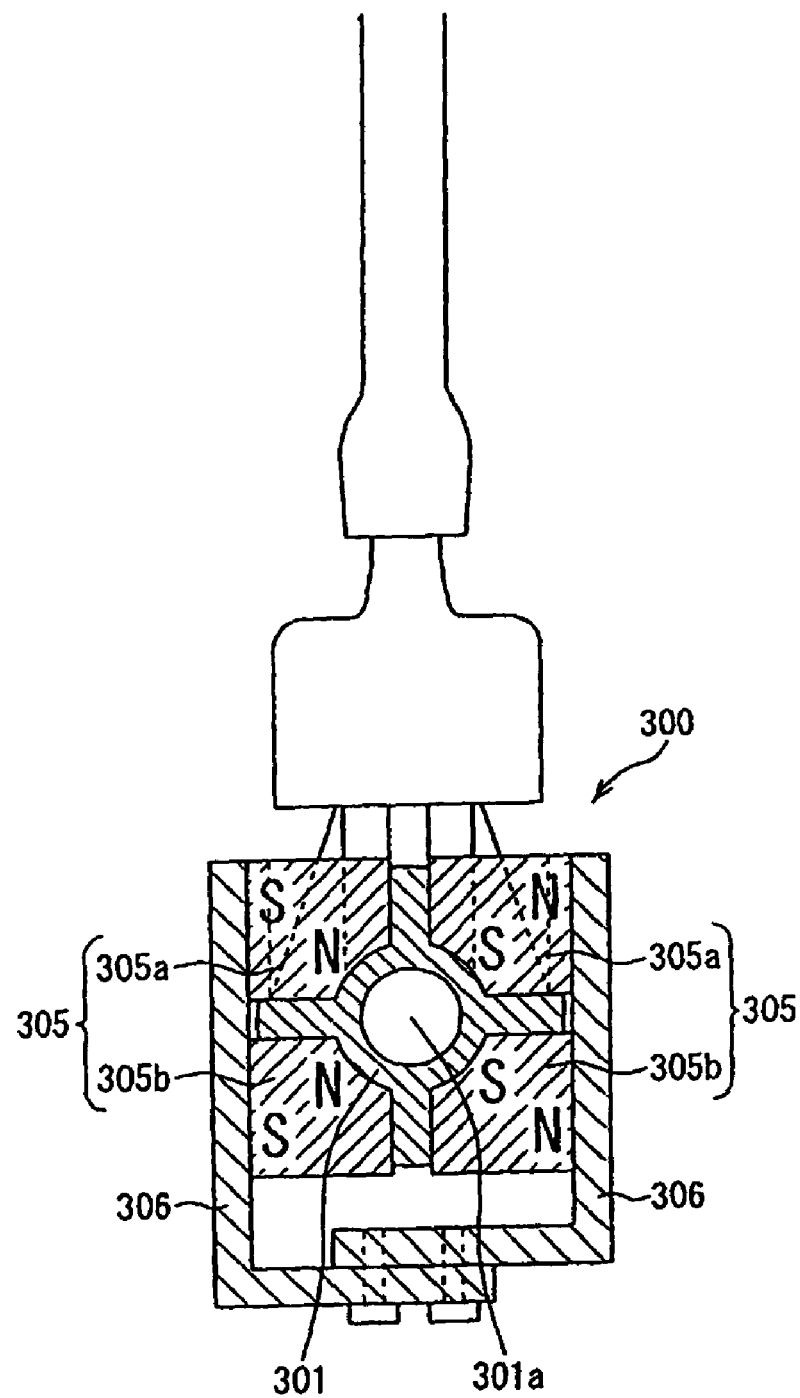
FIG. 19 is a sectional view along line A-A of the gas/liquid mixing device shown in FIG. 8.
Figure 20:
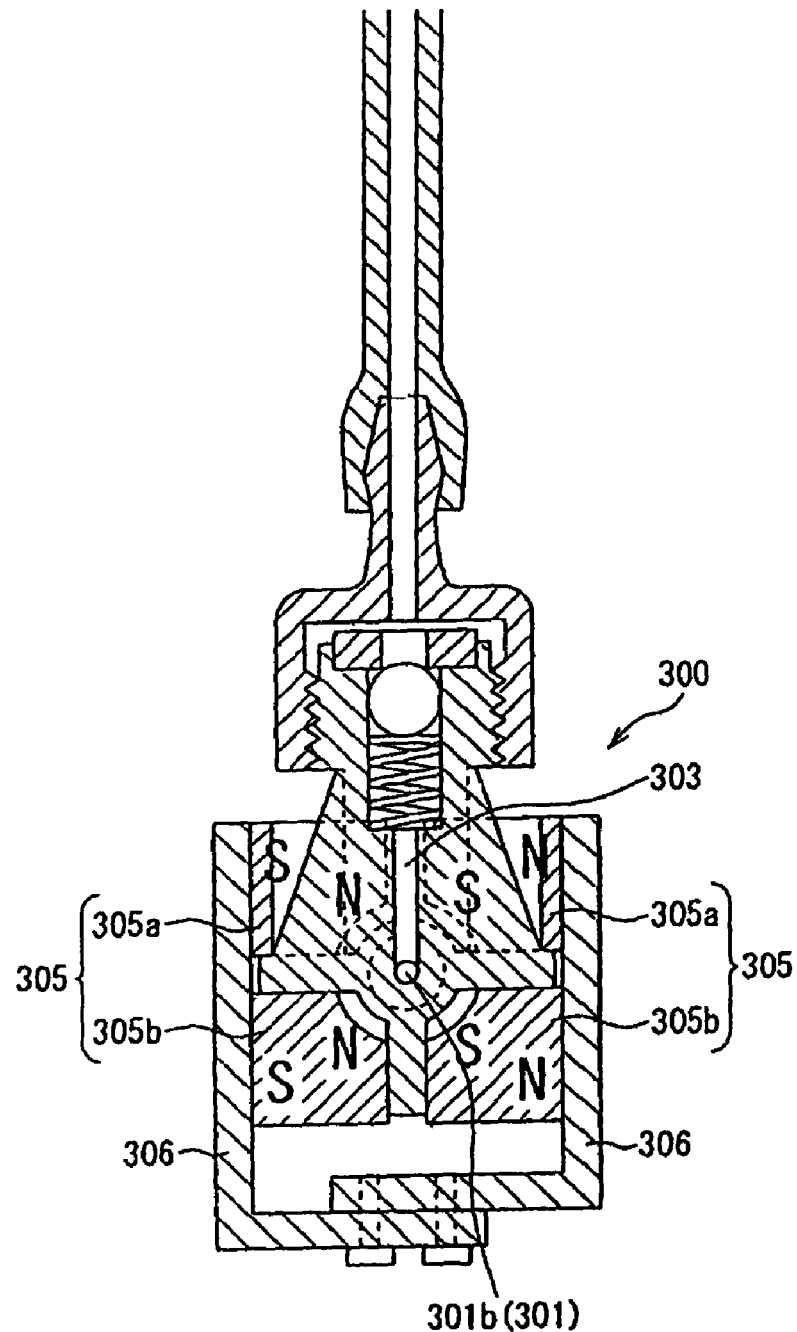
FIG. 20 is a sectional view along line B-B of the gas/liquid mixing device shown in FIG. 8.
Figure 21:
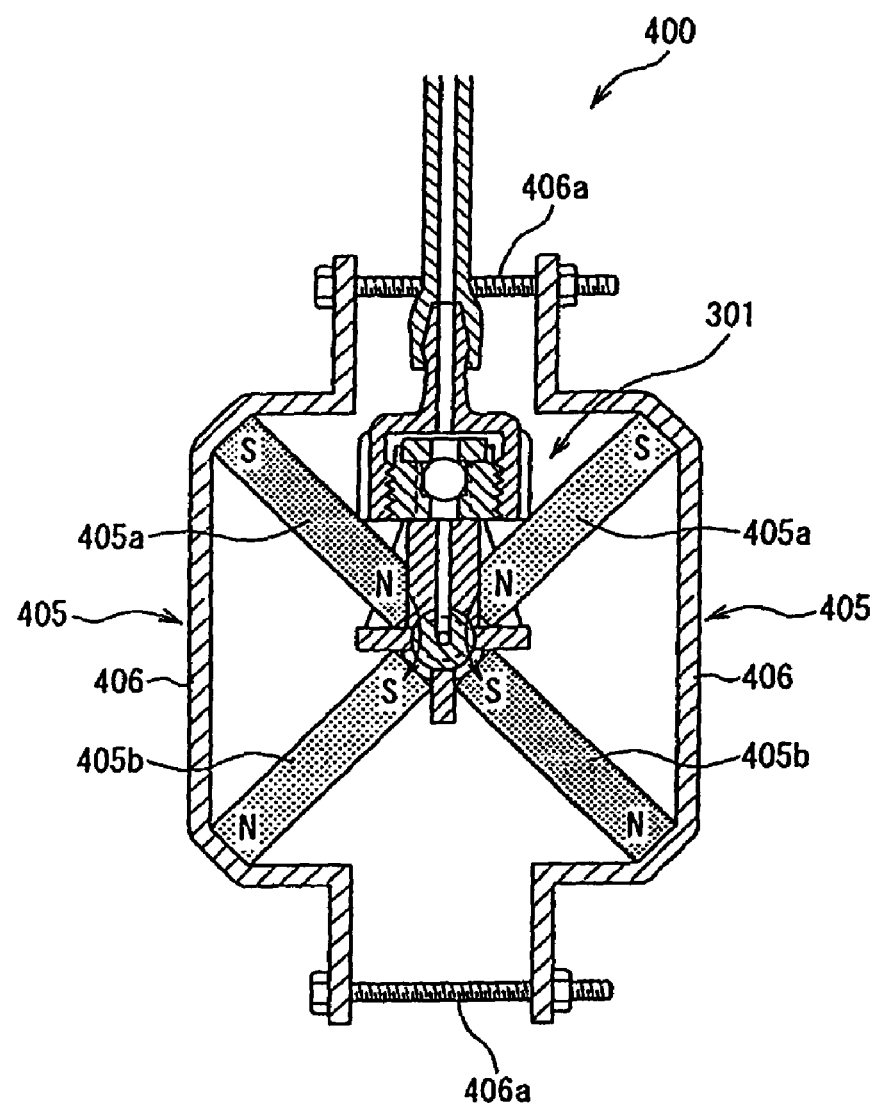
FIG. 21 is a side view of a gas/liquid mixing device comprising two magnetic circuits.
Figure 22:
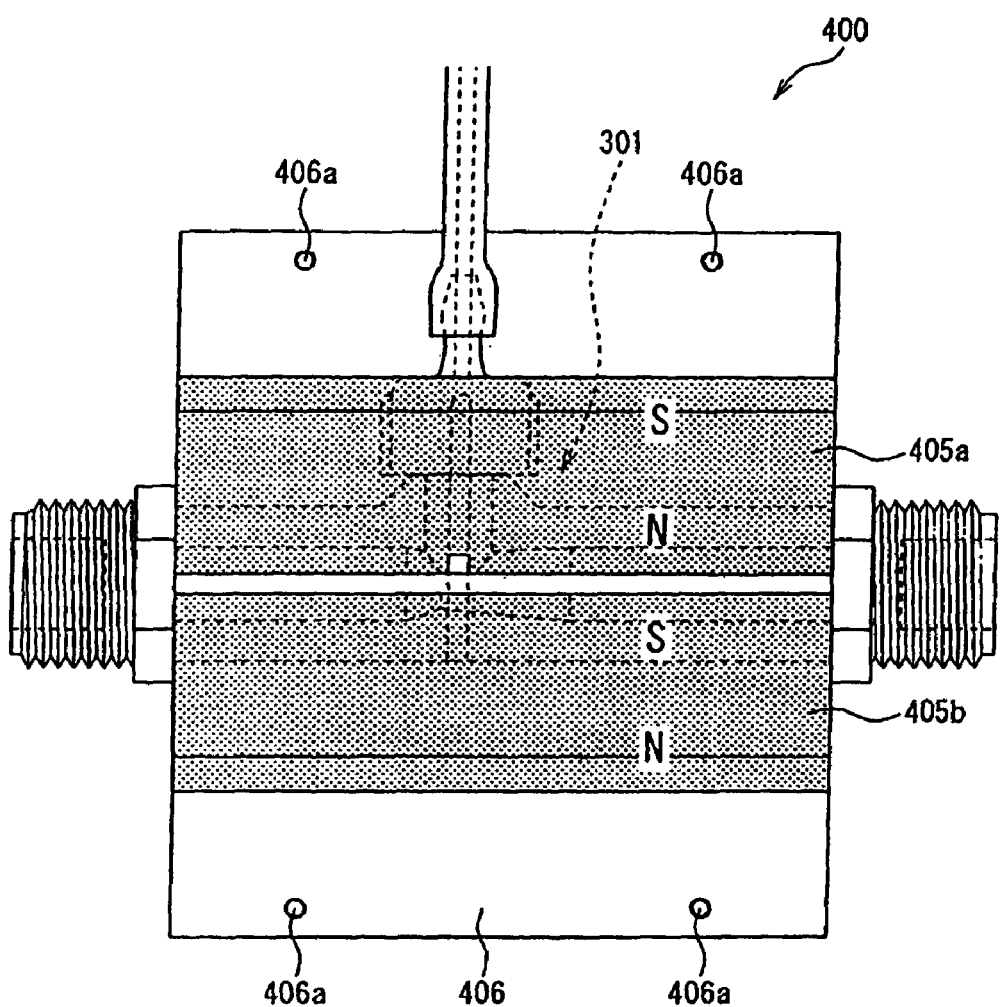
FIG. 22 is a front view of the gas/liquid mixing device shown in FIG. 21.
Figure 23:
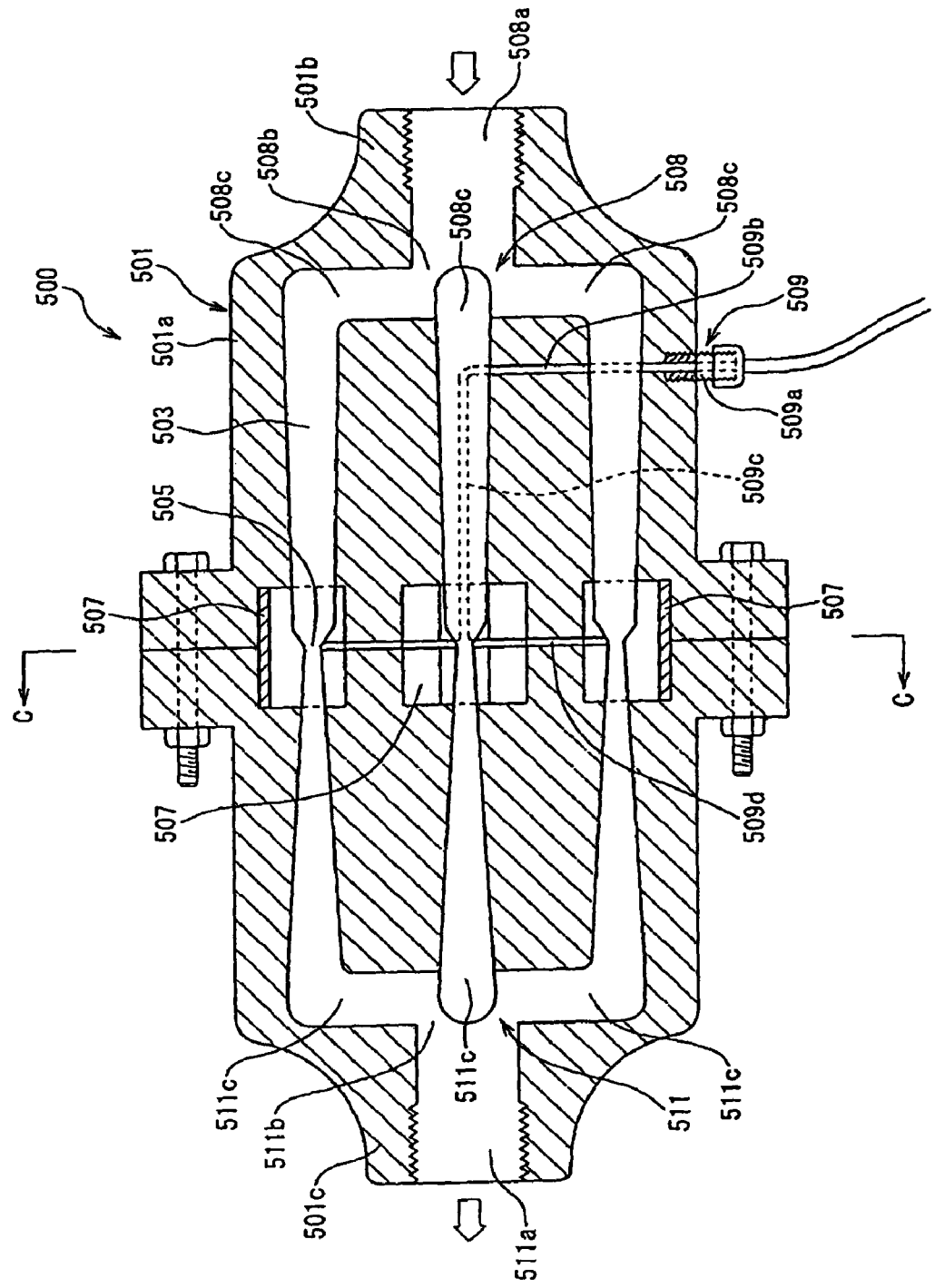
FIG. 23 is longitudinal sectional view of a gas/liquid mixing device having a plurality of large diameter channels (small diameter channels)
Figure 24:
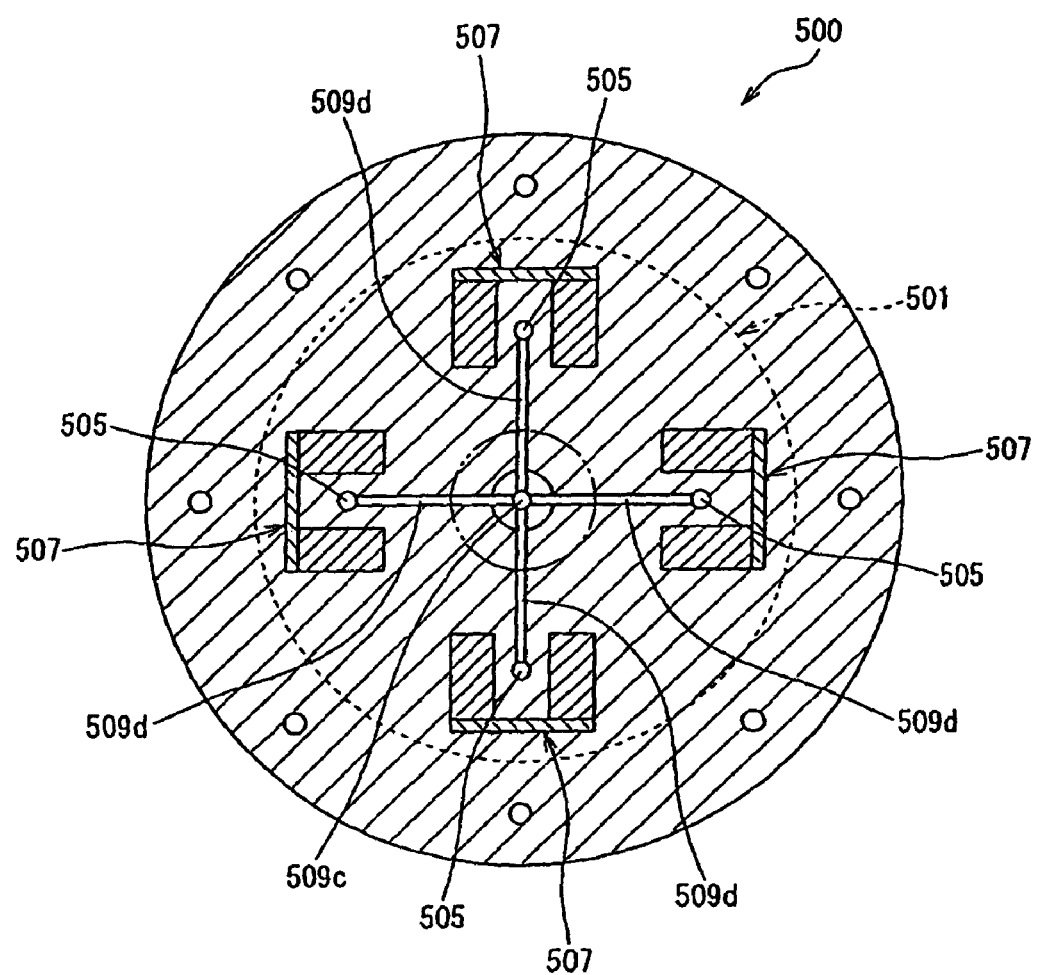
FIG. 24 is a transverse sectional view along line C-C of the gas/liquid mixing device shown in FIG. 23.

Reference will now be made to FIGS. 16 through 24. FIG. 8 is a perspective view of a gas/liquid mixing device. FIG. 16 is an exploded perspective view of a gas/liquid mixing device. FIG. 17 is a perspective view of a Venturi tube. FIG. 18 is a front view of a Venturi tube. FIG. 19 is a cross-sectional view along the line A-A of the gas/liquid mixing device shown in FIG. 8. FIG. 20 is a cross-sectional view along the line B-B of the gas/liquid mixing device shown in FIG. 8. FIG. 21 is a side view of a gas/liquid mixing device comprising two magnetic circuits. FIG. 22 is a front view of the gas/liquid mixing device shown in FIG. 21. FIG. 23 is a longitudinal cross-sectional view of a gas/liquid mixing device (claim 2) having a plurality of large diameter channel (small diameter channel). FIG. 24 is a transverse cross-sectional view of the gas/liquid mixing device shown in FIG. 23.

The first modification of the gas/liquid mixing device will be described with reference to FIGS. 8 and 16 through 20. The gas/liquid mixing device 300 according to the first modification has essentially the same configuration as the gas/liquid mixing device 205 previously described. Specifically, the gas/liquid mixing device 300 is essentially configured from a Venturi tube 301, a gas supply pipe 303 standing upright from the Venturi tube 301, and two magnetic circuits 305, 305. The numerical symbol 301a shown in FIG. 19 indicates the large diameter section of the Venturi tube 301, and the numerical symbol 301b shown in FIG. 20 indicates the small diameter section of the same Venturi tube. The Venturi tube 301 and the gas supply pipe 303 are configured integrally from a magnetic permeable (a property that allows magnetic force lines to pass through) synthetic resin. The magnetic circuits 305 are configured from connecting yokes (connecting members) 306, 306, which are configured from members having greater magnetic permeability than the two magnetic pieces 305a, 305b, as shown in FIGS. 19 and 20. The two pairs of magnetic pieces 305a, 305a and magnetic pieces 305b, 305b facing each other across the Venturi tube 301 are disposed so that their mutually opposite magnetic poles face each other. For example, if the N pole of a magnetic piece 305a is positioned on the side facing the Venturi tube 301, the S pole of the opposing magnetic piece 305b is positioned on the side facing this position. With this type of arrangement, magnetic force lines (magnetic fluxes) emitted from the N poles pass through the Venturi tube 301 to reach the S poles, and magnetic force lines emitted from an N pole and ending at an adjacent S pole (the N pole of one magnetic piece 305a in FIG. 19 and the S pole of the other magnetic piece 305a) pass through the Venturi tube 301. In other words, the number of magnetic force lines passing through the Venturi tube 301 (the small diameter section or other parts thereof) can be increased.

The second modification of the gas/liquid mixing device will be described with reference to FIGS. 21 and 22. The gas/liquid mixing device 400 according to the second modification is a result of further modifying only the magnetic circuits of the gas/liquid mixing device 300 described above. The magnetic circuits 405, 405 of the gas/liquid mixing device 400 are shown in FIGS. 20 and 21. The magnetic circuits 405 are configured from two pairs of magnets, composed of magnet pieces 405a, 405a, 405b, 405b, and connecting yokes 406, 406. The magnet pieces are plate-shaped magnets, and the arrangement of their magnetic poles is the same as that of the magnet pairs according to the previously described first modification. The connecting yokes 406, 406 are connected to each other by screw members 406a, 406a having high magnetic permeability.

The gas/liquid mixing device according to the third modification will be described with reference to FIGS. 23 and 24. The gas/liquid mixing device 500 according to the third modification is configured essentially from a cylinder 501, a group of large diameter channel 503, a group of small diameter channel 505, magnets (magnetic circuits) 507 provided to correspond to the large diameter channel 503 (small diameter channel 505), a liquid supply structure 508 for diverging and supplying liquid to the large diameter channel 503, a gas supply channel 509 for diverging and supplying gas to the large diameter channel 503 in proximity to the small diameter channel 505, and a liquid-receiving structure 511 capable of collecting and receiving the liquid expelled from the large diameter channels 503.

The cylinder 501 is entirely configured from a magnetic permeable synthetic resin, and is configured essentially from a cylindrical cylinder main body 501a, and an input part 501b and output part 501c extending in a tapering manner from either end of the cylinder main body 501a. The cylinder main body 501a is configured from two units divided in the length direction, both of which are fixed and integrated together by screws. The reason the cylinder is divided into units is because it is easier to form the large diameter channels 505 (small diameter channels 505) or the like in the cylinder main body 501a. The configuration is designed so that liquid enters through the input part 501b and exits from the output part 501c; i.e., so that liquid passes through the length direction of the cylinder 501. The large diameter channels 503 are formed into the same shape along length direction of the cylinder main body 501a, and are arranged along the circumferential direction of the cylinder main body 501a at equal intervals in a radial pattern. Four large diameter channels 503 are formed in the third modification, but this number can be increased or reduced as appropriate in accordance with the amount of liquid treated and other factors. The small diameter channels 505 are formed within the paths of the large diameter channels 503, and the relationship between the large diameter channels 503 and the small diameter channels 505 is no different from the relationship between the large diameter channel (large diameter section) and small diameter channel (small diameter section) of the gas/liquid mixing devices 205, 300, 400, and 500 previously described. The liquid supply structure 508 is configured from an input channel 508a passing through the input part 501b, and radial channels 508c, . . . that spread in a radial pattern starting at the terminal end 508b of the input channel 508a, wherein the radial channels 508c are communicated with the large diameter channels 503 at one end. Therefore, the distances from the input channel 508a from the input-side ends of the large diameter channels 503 are substantially uniform. Liquid can be supplied to the large diameter channels 503 in a well-balanced manner. The liquid-receiving structure 511 is configured from an output channel 511a passing through the output part 501c, and radial channels 511c, ... spreading in a radial pattern starting at a proximal end 511b upstream of the output channel 511a, wherein the radial channels 511c are communicated with the other ends of the large diameter channels 503. Therefore, the distances from the output channel 511a to the output-side ends of the large diameter channels 503 are substantially uniform. This is to ensure that the liquid exhausted from the large diameter channels 503 is received in a well-balanced manner and none of the large diameter channels 503 bear an excessive load. The inside diameter of the small diameter channels 505 is preferably 3 mm or less, and more preferably 2 mm or less, as demonstrated by the results of the hole diameter experiment previously described. The smaller the hole diameter, the less the treated amount, but on the other hand, the gas dissolution rate can be increased, and the treated amount can be compensated for by increasing the number of large diameter channels 503 (small diameter channels 505).

The gas supply channel 509 is configured from a check valve 509a attached near the input part 501b of the cylinder main body 501a in order to receive the supply of gas from the exterior, a first tube 509b which communicates with the check valve 509a inside the cylinder main body 501a and leads into the center of the cylinder main body 501a, a second tube 509c (shown by the dashed lines in FIG. 23) which curves at a substantial right angle from the terminal end of the first tube 509b and extends toward the output part 501c, and a plurality (the same number as the small diameter channels 505) of third tubes 509d, ... spreading out in a radial pattern starting from the terminal end of the second tube 509c, which extends up to the vicinities of the small diameter channels 505. The terminal ends of the third tubes 509d are communicated with the large diameter channels 503 in the downstream vicinities of the small diameter channels 505. The distances from the check valve 509a to the large diameter channels 503 are formed so as to be substantially the same, whereby gas is supplied uniformly to the large diameter channels 503 from the check valve 509a.

Placed in proximity to the small diameter channels 505 are magnetic circuits (magnets) 507 for generating magnetic force lines capable of extending through the liquid passing through the small diameter channels and through the gas bubbles of the gas contained in the liquid.

According to the gas/liquid mixing device 500, it is possible to simultaneously perform a plurality of functions, similar to the gas/liquid mixing devices 205, 300, 400, and 500 previously described. Specifically, liquid supplied from the exterior via the liquid supply structure 508 and gas supplied from the exterior via the gas supply channel 509 can be mixed efficiently, and mixing efficiency can be improved quantitatively as well. Going into greater detail, the action takes place as follows. Specifically, a pressure difference (negative pressure) is created by the Bernoulli process in the liquid (e.g., tap water, well water, filtered river or ocean water, pure water, ultrapure water, or a liquid or mixed liquid other than water) entering the small diameter channels from the large diameter channels, and this pressure difference draws the gas (e.g., ozone, oxygen, nitrogen, hydrogen, atmospheric air, or another mixed gas) supplied from the gas supply channels into the liquid. The gas that has been drawn in is contained in the liquid in the form of gas bubbles. At this time, the liquid and gas bubbles are stirred up by the turbulent flow in the small diameter channels. The magnetic force lines emitted from the magnetic circuits 515 are made to extend through the stirred gas and gas bubbles, whereby the gas and liquid are mixed together more efficiently than in cases of no through-extension of magnetic force lines. Since the gas/liquid mixing action described above takes place simultaneously in a plurality of large diameter channels 503 (small diameter channels 505), mixing efficiency can be improved from a quantitative standpoint. The gas/liquid-containing liquid that has passed through the large diameter channels (small diameter channels) is collected by the liquid-receiving structure and can be extracted all at once. The entire gas/liquid mixing device 500 is divided into units by forming a plurality of large diameter channels 503 (small diameter channels 505) or the like in the cylinder 501, but the purpose of this is to make the entire device more compact. Other possibilities for dividing the device into units include grouping a plurality of gas/liquid mixing devices together and binding all of the devices with a binder, or coating all of the devices with a synthetic resin. Another possibility is to prepare in advance a plurality of gas/liquid mixing devices, as typified by the gas/liquid mixing devices 205, 300, and 400, and to use these devices while they remain separate but aligned in parallel, under the same principle as the gas/liquid mixing device 500. In cases in which a plurality of devices are used in parallel, care should be taken so as to achieve a balance between the gas and treated water supplied to the gas/liquid mixing devices.

The invention claimed is:

1. A gas/liquid mixing device comprising:

a magnetically transparent cylinder whose length direction is the direction in which liquid passes;

a plurality of large diameter channels extending through the cylinder in the length direction;

a small diameter channel formed midway in each of the large diameter channels;

a gas supply channel for supplying gas to the liquid passing through the small diameter channel;

a magnet for generating magnetic force lines capable of extending through the liquid passing through at least each of the small diameter channels and concurrently through gas bubbles of the gas contained in the liquid;

a liquid supply structure capable of diverging and supplying liquid to each of the large diameter channels;

a liquid-receiving structure capable of collecting and receiving the liquid exhausted from each of the large diameter channels; and a gas supply structure capable of diverging and supplying gas to the gas supply channel in each of the large diameter channels.

2. The gas/liquid mixing device according to claim 1, wherein:

the magnet is configured from a first magnetic circuit containing one magnet piece and another magnet piece; and the one magnet piece and the another magnet piece are placed so that the magnetic force lines generated from the one magnet are capable of traversing the small diameter section to reach the another magnet piece.

3. The gas/liquid mixing device according to claim 2, wherein the magnetic force of the magnet is set at from 3000 to 20000 Gauss.

4. The gas/liquid mixing device according to claim 3, wherein the distance between the one magnet piece and the another magnet piece is set to be less than the diameter D of the large diameter section.

5. The gas/liquid mixing device according to claim 4, wherein: at least one other magnetic circuit having substantially the same structure as the first magnetic circuit is placed along the circumferential direction of the small diameter section at a predetermined interval from the magnetic circuit.

6. The gas/liquid mixing device according to claim 1, wherein each of the large diameter channels and each of the small diameter channels are formed so as to have substantially the same shape, and each of the small diameter channels has an outside diameter of 3 mm or less.

* * * * *